(12) United States Patent
Thorn et al.

(10) Patent No.: US 7,501,372 B2
(45) Date of Patent: Mar. 10, 2009

(54) CATALYST COMPOSITIONS FOR PRODUCING POLYOLEFINS IN THE ABSENCE OF COCATALYSTS

(75) Inventors: Matthew G. Thorn, Bartlesville, OK (US); Qing Yang, Bartlesville, OK (US); Kumi C. Jayaratne, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 199 days.

(21) Appl. No.: 10/720,024

(22) Filed: Nov. 21, 2003

(65) Prior Publication Data

US 2005/0113243 A1    May 26, 2005

(51) Int. Cl.
*B01J 37/22* (2006.01)
*B01J 31/00* (2006.01)
*C08F 4/608* (2006.01)
*C08F 4/76* (2006.01)

(52) U.S. Cl. .................. 502/119; 502/130; 502/439; 526/130; 526/160; 526/170; 526/943; 526/941

(58) Field of Classification Search ............... 526/160, 526/170, 943, 127, 129, 130, 135, 137, 140, 526/138, 146, 156; 502/113, 119, 122, 117, 502/103, 152, 439

See application file for complete search history.

(56) References Cited

U.S. PATENT DOCUMENTS

| | | | |
|---|---|---|---|
| 6,107,230 A * | 8/2000 | McDaniel et al. | 502/104 |
| 6,235,918 B1 * | 5/2001 | Marks et al. | 556/53 |
| 6,239,059 B1 * | 5/2001 | Saudemont et al. | 502/120 |
| 6,355,594 B1 * | 3/2002 | McDaniel et al. | 502/152 |
| 6,376,415 B1 * | 4/2002 | McDaniel et al. | 502/113 |
| 6,395,666 B1 * | 5/2002 | McDaniel et al. | 502/87 |
| 6,524,987 B1 | 2/2003 | Collins et al. | |
| 6,559,090 B1 | 5/2003 | Shih et al. | |
| 6,667,274 B1 * | 12/2003 | Hawley et al. | 502/415 |
| 6,900,154 B2 * | 5/2005 | McCullough et al. | 502/119 |
| 7,098,277 B2 * | 8/2006 | Lin et al. | 526/134 |

FOREIGN PATENT DOCUMENTS

| | | |
|---|---|---|
| EP | 591 756 A2 * | 4/1994 |
| EP | 0 927 201 B1 | 7/1999 |
| WO | WO 02/16480 A2 * | 2/2002 |

OTHER PUBLICATIONS

Ahn et al. Organometallics 2002, 21, 1788-1806.*
Marks, "Surface-Bound Metal Hydrocarbyls. Organmetallic Connections Between Herterogeneous & Homogeneous Catalysis", Accts of Chem. Res., vol. 25, No. 2 pp. 57-65 (Feb. 1992).
Jezequel, et al., Supported Metallocene Catalysts by Surface Organometallic Chemistry. Synthesis, Characterization . . . , J. Am. Chem. Soc. vol. 123, pp. 3520-3540 (2001).
Wailes, P.C. et al., Organometallic Chemistry of Titanium, Zirconium and Hafnium, Organometallic Chemistry, pp. 89,91,92,150,151,155, (Academic Press NY 1974).
Cardin, D.J. et al., Chemistry of Organo-Zirconium and Hafnium Compounds, pp. 145-160 (Halstead Press NY 1986).
Hongsang, A. et al. Surface Organozirconium-Electrophiles Activated by Chemisorption on "Super Acidic" Sulfated Zirconia . . . , Organometallics, vol. 2002, No. 12, pp. 1788-1806.
Charoenchaidet, S. et al., Methylaluminoxane-Free Ethylene Polymerization With In Situ Activated Zirconocene Triisobutylaluminum Catalysts And Silica-Supported Stabilized Borate Cocatalysts, J. Polymer Science, Part A: Polymer Chemistry, vol. 40: No. 19, pp. 3240-3248 (Oct. 1, 2002).
Das, P.K., Computational Chemistry of Metallocene Catalyzed Olefin Polymerization, 21st Century Symp. at S.W. Reg. Amer. Chem. Soc. Mtg. (OK Oct. 26-28, 2003).

* cited by examiner

*Primary Examiner*—Vasu Jagannathan
*Assistant Examiner*—Rip A. Lee
(74) *Attorney, Agent, or Firm*—Fletcher Yoder

(57) ABSTRACT

This invention relates to the field of olefin polymerization catalyst compositions, and methods for the polymerization and copolymerization of olefins, including polymerization methods using a supported catalyst composition. One aspect of this invention is the prepraration and use of a catalyst composition comprising a hydrocarbyl-substituted metallocene compound and a chemically-treated solid oxide for olefin polymerization processes. In another aspect, for example, this invention encompasses the preparation of a catalyst composition comprising ($\eta$5-cycloalkadienyl)$_2$Zr (hydrocarbyl)$_2$ complexes and sulfated alumina, but containing no organoaluminum or organoboron cocatalysts, and further the use of this catalyst composition for polymerizing olefins.

6 Claims, 1 Drawing Sheet

CATALYST COMPOSITIONS FOR PRODUCING POLYOLEFINS IN THE ABSENCE OF COCATALYSTS

TECHNICAL FIELD OF THE INVENTION

This invention relates to the field of organometal compositions, olefin polymerization catalyst compositions, methods for the polymerization and copolymerization of olefins using a catalyst composition, and polyolefins.

BACKGROUND OF THE INVENTION

It is known that mono-1-olefins ($\alpha$-olefins), including ethylene, can be polymerized with catalyst compositions employing titanium, zirconium, vanadium, chromium or other metals, impregnated on a variety of support materials, often in the presence of cocatalysts. These catalyst compositions may be useful for both homopolymerization of ethylene, as well as copolymerization of ethylene with comonomers such as propylene, 1-butene, 1-hexene, or other higher $\alpha$-olefins. Therefore, there exists a constant search to develop new olefin polymerization catalysts, catalyst activation processes, and methods of making and using catalysts, that will provide enhanced catalytic activities and polymeric materials tailored to specific end uses.

One type of catalyst system comprises organometal compounds, particularly metallocene compounds. Often, metallocene compounds are used in catalyst compositions along with activating cocatalysts such as aluminoxanes or organoboron compounds. Therefore, it is of interest to develop metallocene-based catalytic systems that can be activated with different, possibly less-expensive activating agents, yet still provide good polymerization activities. It is also of interest to develop metallocene-based catalytic systems that polymerize olefins without the need for cocatalysts.

SUMMARY OF THE INVENTION

This invention comprises catalyst compositions, methods for preparing catalyst compositions, and methods for polymerizing olefins using the catalyst compositions disclosed herein. It was discovered that certain types of metallocene compounds can be contacted with a chemically-treated solid oxide to form a catalyst composition for the polymerization of olefins, without the need for any cocatalysts such as aluminoxanes or organoboron compounds. In particular, the present invention encompasses new catalyst compositions comprising metallocene compounds that are coordinated by at least one hydrocarbyl ligand, having from 1 to about 20 carbon atoms. The new catalyst compositions further comprise a chemically-treated solid oxide, wherein the chemically-treated solid oxide comprises a solid oxide treated with an electron-withdrawing anion.

In one aspect, this invention encompasses a catalyst composition comprising at least one metallocene compound and at least one chemically-treated solid oxide, wherein:

a) the metallocene compound has the following formula:

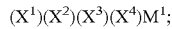

wherein $M^1$ is selected from titanium, zirconium, hafnium, vanadium, niobium, tantalum, chromium, molybdenum, or tungsten;

($X^1$) is selected from a Group-I ligand, wherein the Group-I ligand is selected from a cyclopentadienyl, an indenyl, a fluorenyl, a substituted cyclopentadienyl, a substituted indenyl, or a substituted fluorenyl;

wherein each substituent on the substituted cyclopentadienyl, substituted indenyl, or substituted fluorenyl ($X^1$) is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, having from 1 to about 20 carbon atoms; a halide; or hydrogen;

($X^3$) is selected from an aliphatic group, an aromatic group, a cyclic group, a combination of aliphatic and cyclic groups, or a substituted derivative thereof, having from 1 to about 20 carbon atoms;

($X^4$) is independently selected from a Group-II ligand, wherein the Group-II ligand is selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, having from 1 to about 20 carbon atoms; or a halide;

($X^2$) is independently selected from a Group-I or a Group-II ligand;

wherein ($X^1$) and ($X^2$) are optionally connected by a bridging group, wherein the length of the bridging group between ($X^1$) and ($X^2$) is one, two, or three atoms; the one, two, or one, two, or three atoms of the bridging group are independently selected from C, Si, Ge, or Sn; the bridging group is saturated or unsaturated; and the bridging group is substituted or unsubstituted; and wherein any substituent on the bridging group is independently selected from an alkenyl group, an alkynyl group, an alkadienyl group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, having from 1 to about 20 carbon atoms; a halide; or hydrogen; and b) the chemically-treated solid oxide comprises a solid oxide treated with an electron-withdrawing anion;

wherein the solid oxide is selected from silica, alumina, silica-alumina, aluminum phosphate, heteropolytungstates, titania, zirconia, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

At least one substituent on ($X^1$) or ($X^2$) can be a bridging group that connects or bridges the ($X^1$) and ($X^2$) ligands, as long as the bridging group does not prevent the catalytic activity of the catalyst composition.

In another aspect, this invention encompasses a catalyst composition consisting essentially of a hydrocarbyl-substituted metallocene compound and a chemically-treated solid oxide, as disclosed herein. In yet another aspect, this invention encompasses a catalyst composition consisting of a hydrocarbyl-substituted metallocene compound and a chemically-treated solid oxide, as disclosed herein.

In still another aspect, this invention encompasses a process to produce a catalyst composition comprising contacting at least one hydrocarbyl-substituted metallocene compound and at least one chemically-treated solid oxide.

The present invention further encompasses methods for polymerizing olefins comprising contacting at least one olefin monomer and the catalyst composition of this invention under polymerization conditions to produce the polymer.

As used herein the term metallocene is used to refer to metallocene and metallocene-like compounds containing one or two $\eta^5$-alkadienyl ligands. In one aspect, the metalloceme contains one or two $\eta^5$-cycloalkadienyl ligands. In another aspect, the metallocene contains one or two $\eta^5$-cyclopentadienyl ligands, or its analogs or derivatives, including $\eta^5$-indenyl and $\eta^5$-fluorenyl ligands.

The term hydrocarbyl is used to specify a hydrocarbon radical group that includes, but is not limited to aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, heteroatom substituted derivatives thereof, having from one to about 20 carbon atoms.

In another aspect of this invention, the chemically-treated solid oxide of the catalyst composition comprises a solid oxide treated with an electron-withdrawing anion, wherein the solid oxide is selected from silica, alumina, silica-alumina, aluminum phosphate, heteropolytungstates, titania, zirconia, magnesia, boria, zinc oxide, mixed oxides thereof, or mixtures thereof; and the electron-withdrawing anion is selected from fluoride, chloride, bromide, phosphate, triflate, bisulfate, sulfate, or combinations thereof. Further, the chemically-treated solid oxide optionally contains another metal, including but not limited to, zinc. In one aspect, examples of chemically-treated solid oxides include, but are not limited to, sulfated alumina, fluorided silica-alumina, and chlorided zinc-alumina.

In one aspect, the catalyst composition of this invention further comprises an optional cocatalyst. While not intending to be bound by theory, it is believed that the cocatalyst functions as, among other things, a scavenger to remove traces of water and oxygen from the catalyst composition. Several different cocatalysts may be used to in this catalyst composition including, but not limited to, organoaluminum compounds, aluminoxanes, organozinc compounds, organoboron compounds, ionizing ionic compounds, clay materials, or any combination thereof.

In another aspect, the catalyst composition further comprises an optional organoalumium cocatalyst, selected from a compound with the following formula:

$$Al(X^5)_n(X^6)_{3-n};$$

wherein $(X^5)$ is a hydrocarbyl having from 1 to about 20 carbon atoms; $(X^6)$ is selected from halide, hydride, alkoxide, or aryloxide; and n is a number from 1 to 3, inclusive.

In still another aspect, the catalyst composition further comprises an optional organozinc cocatalyst, selected from a compound with the following formula:

$$Zn(X^5)(X^6);$$

wherein $(X^5)$ is a hydrocarbyl having from 1 to about 20 carbon atoms; $(X^6)$ is selected from a hydrocarbyl, an alkoxide or an aryloxide having from 1 to about 20 carbon atoms, halide, or hydride.

In yet another aspect, the catalyst composition further comprises an optional aluminoxane cocatalyst, wherein the aluminoxane comprises:

a cyclic aluminoxane having the formula:

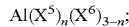

wherein

R is a linear or branched alkyl having from 1 to 10 carbon atoms, and n is an integer from 3 to about 10;

a linear aluminoxane having the formula:

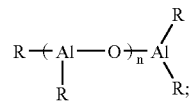

wherein

R is a linear or branched alkyl having from 1 to 10 carbon atoms, and n is an integer from 1 to about 50;

a cage aluminoxane having the formula $R^t_{5m+\alpha}R^b_{m-\alpha}Al_{4m}O_{3m}$, wherein m is 3 or 4 and $\alpha$ is $=n_{Al(3)}-n_{O(2)}+n_{O(4)}$; wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ represents a terminal alkyl group, and $R^b$ represents a bridging alkyl group; wherein R is a linear or branched alkyl having from 1 to 10 carbon atoms; or any combination thereof.

In another aspect, the catalyst composition further comprises an optional organoboron compound, selected from tris(pentafluorophenyl)boron, tris[3,5-bis(trifluoromethyl)phenyl]boron, or a combination thereof.

In still another aspect, the catalyst composition further comprises an optional ionizing ionic compound, selected from a borate compound, an aluminate compound, or a combination thereof.

In yet another aspect, the catalyst composition further comprises an optional clay material, selected from clays and other natural and synthetic layered oxides, cogelled clay matrices containing silica or other oxides, pillared clays, zeolites, clay minerals, other layered minerals, or combinations thereof, including but not limited to ion exchangeable layered minerals (natural or synthetic) or composites made from such compounds, or any combinations thereof, regardless of whether the layered structure remains intact or not.

This invention also encompasses methods of making catalyst compositions that comprise contacting at least one hydrocarbyl-substituted metallocene compound and an chemically-treated solid oxide, and optionally contacting these components with a cocatalyst. This invention also encompasses precontacting some or all of the catalyst components, and optionally pretreating some or all of these components with an olefin compound, prior to initiating the polymerization reaction.

The present invention further comprises methods for polymerizing olefins comprising contacting at least one olefin monomer and the catalyst composition under polymerization conditions to produce the polymer.

This invention further comprises the polyolefins described herein.

This invention also encompasses an article that comprises the polymer produced with the catalyst composition of this invention.

These and other features, aspects, embodiments, and advantages of the present invention will become apparent after a review of the following detailed description of the disclosed features.

DETAILED DESCRIPTION OF THE INVENTION

Figure 1:
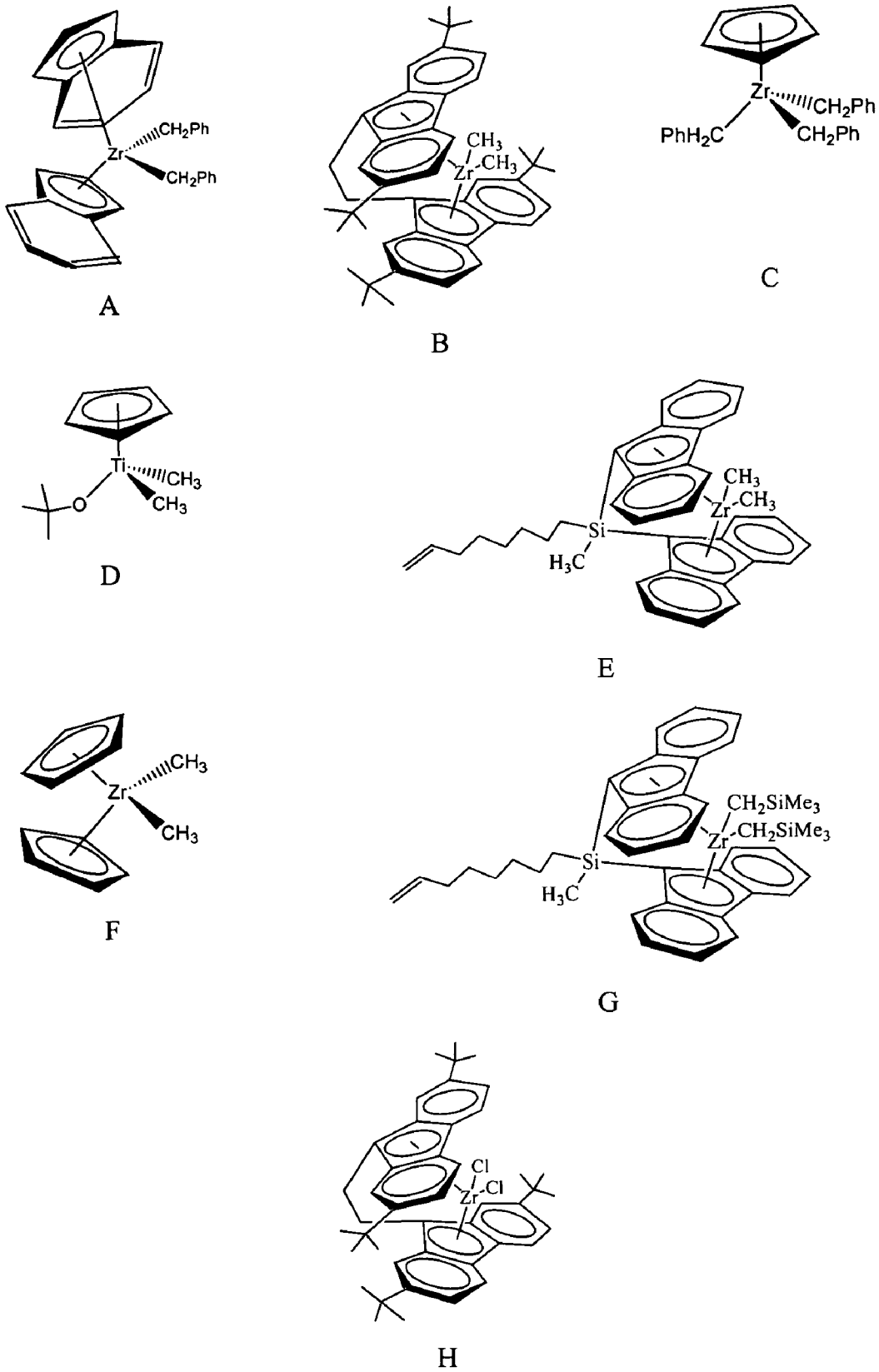
FIG. 1 illustrates the structures of the hydrocarbyl-substituted and non-hydrocarbyl-substituted metallocenes used in the polymerization runs recorded in Table 1.

The present invention provides new catalyst compositions, methods for preparing catalyst compositions, methods for using the catalyst compositions to polymerize olefin, and polyolefins. In accordance with this invention, the catalyst composition comprises at least one hydrocarbyl-substituted metallocene compound and a chemically-treated solid oxide, and does not require the presence of a cocatalyst to polymerize olefins. However, a cocatalyst may optionally be added to the catalyst composition. In accordance with this invention, the chemically-treated solid oxide comprises a solid oxide that has been treated with an electron-withdrawing anion from an ionic or molecular species, and optionally treated with another metal in addition to an electron-withdrawing anion.

Catalyst Composition—The Hydrocarbyl-Substituted Metallocene

The present invention provides catalyst compositions comprising one or more hydrocarbyl-substituted metallocenes, and a chemically-treated solid oxide. The metallocene compound of this invention typically comprises a hydrocarbyl-substituted metallocene of a metal selected from titanium, zirconium, hafnium, vanadium, niobium, tantalum, chromium, molybdenum, or tungsten. In one aspect, the metallocene comprises at least one hydrocarbyl-substituted metallocene compound having the following general formula:

In one aspect, this invention encompasses a catalyst composition comprising a metallocene compound and a chemically-treated solid oxide, wherein:

a) the metallocene compound has the following formula:

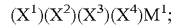

$(X^1)(X^2)(X^3)(X^4)M^1$;

wherein $M^1$ is selected from titanium, zirconium, hafnium, vanadium, niobium, tantalum, chromium, molybdenum, or tungsten;

$(X^1)$ is selected from a Group-I ligand, wherein the Group-I ligand is selected from a cyclopentadienyl, an indenyl, a fluorenyl, a substituted cyclopentadienyl, a substituted indenyl, or a substituted fluorenyl;

wherein each substituent on the substituted cyclopentadienyl, substituted indenyl, or substituted fluorenyl $(X^1)$ is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, having from 1 to about 20 carbon atoms; a halide; or hydrogen;

$(X^3)$ is selected from an aliphatic group, an aromatic group, a cyclic group, a combination of aliphatic and cyclic groups, or a substituted derivative thereof, having from 1 to about 20 carbon atoms;

$(X^4)$ is independently selected from a Group-II ligand, wherein the Group-II ligand is selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, having from 1 to about 20 carbon atoms; or a halide;

$(X^2)$ is independently selected from a Group-I or a Group-II ligand;

wherein $(X^1)$ and $(X^2)$ are optionally connected by a bridging group, wherein the length of the bridging group between $(X^1)$ and $(X^2)$ is one, two, or three atoms; the one, two, or one, two, or three atoms of the bridging group are independently selected from C, Si, Ge, or Sn; the bridging group is saturated or unsaturated; and the bridging group is substituted or unsubstituted; and wherein any substituent on the bridging group is independently selected from an alkenyl group, an alkynyl group, an alkadienyl group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, having from 1 to about 20 carbon atoms; a halide; or hydrogen; and b) the chemically-treated solid oxide comprises a solid oxide treated with an electron-withdrawing anion;

wherein the solid oxide is selected from silica, alumina, silica-alumina, aluminum phosphate, heteropolytungstates, titania, zirconia, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

Thus, one aspect of this invention is the metallocene compound, wherein at least the $(X^3)$ ligand on $M^1$ is a hydrocarbyl ligand typically comprising from 1 to about 20 carbon atoms. In another aspect, the $(X^3)$ and $(X^4)$ ligands on $M^1$ are hydrocarbyl ligand typically comprising from 1 to about 20 carbon atoms. In still another aspect, the $(X^2)$, $(X^3)$, and $(X^4)$ ligands on $M^1$ are hydrocarbyl ligand typically comprising from 1 to about 20 carbon atoms.

For the formula $(X^1)(X^2)(X^3)(X^4)M^1$, examples of chemical moieties or groups that may be selected as substituents on the substituted cyclopentadienyls, substituted indenyls, and substituted fluorenyls of $(X^1)$, may be selected for the $(X^4)$ group, or may be selected as a substituent on the bridging ligand include, but are not limited to, the following. In each example presented herein, unless otherwise specified, R is independently selected from H, an aliphatic group, an aromatic group, a cyclic group, combinations thereof, or substituted derivatives thereof, including but not limited to, halide, alkoxide, and amide derivatives thereof, having from 1 to about 20 carbon atoms.

Examples of aliphatic groups, in each instance, include but are not limited to, hydrocarbyls such as paraffins and olefins having from 1 to about 20 carbon atoms. For example, aliphatic groups as used herein include methyl, ethyl, propyl, n-butyl, tert-butyl, sec-butyl, isobutyl, amyl, isoamyl, hexyl, cyclohexyl, heptyl, octyl, nonyl, decyl, dodecyl, 2-ethylhexyl, pentenyl, butenyl, and the like.

Examples of cyclic groups include, but are not limited to, cycloparaffins, cycloolefins, cycloacetylenes, arenes such as phenyl, bicyclic groups and the like, including substituted derivatives thereof, having from 3 to about 20 carbon atoms.

Examples of halides include fluoride, chloride, bromide, and iodide.

Oxygen groups are oxygen-containing groups, examples of which include, but are not limited to, alkoxy or aryloxy groups (—OR), —OC(O)R, —OC(O)H, —OSiR$_3$, —OPR$_2$, —OAlR$_2$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms. Examples of alkoxy or aryloxy groups (—OR) groups include, but are not limited to, methoxy, ethoxy, propoxy, butoxy, phenoxy, substituted phenoxy, and the like.

Sulfur groups are sulfur-containing groups, examples of which include, but are not limited to, —SR, —OSO$_2$R, —OSO$_2$OR, —SCN, —SO$_2$R, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

Nitrogen groups are nitrogen-containing groups, which include, but are not limited to, —NH$_2$, —NHR, —NR$_2$, —NO$_2$, —N$_3$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

Phosphorus groups are phosphorus-containing groups, which include, but are not limited to, —PH$_2$, —PHR, —PR$_2$, —P(O)R$_2$, —P(OR)$_2$, —P(O)(OR)$_2$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

Arsenic groups are arsenic-containing groups, which include, but are not limited to, —AsHR, —AsR$_2$, —As(O)R$_2$, —As(OR)$_2$, —As(O)(OR)$_2$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

Carbon groups are carbon-containing groups, which include, but are not limited to, alkyl halide groups that comprise halide-substituted alkyl groups with 1 to about 20 carbon atoms, aralkyl groups with 1 to about 20 carbon atoms, —C(O)H, —C(O)R, —C(O)OR, cyano, —C(NR)H, —C(NR)R, —C(NR)OR, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

Silicon groups are silicon-containing groups, which include, but are not limited to, silyl groups such alkylsilyl groups, arylsilyl groups, arylalkylsilyl groups, siloxy groups, and the like, which in each instance have from 1 to about 20 carbon atoms. For example, silicon groups include trimethylsilyl and phenyloctylsilyl groups.

Germanium groups are germanium-containing groups, which include, but are not limited to, germyl groups such alkylgermyl groups, arylgermyl groups, arylalkylgermyl groups, germyloxy groups, and the like, which in each instance have from 1 to about 20 carbon atoms.

Tin groups are tin-containing groups, which include, but are not limited to, stannyl groups such alkylstannyl groups, arylstannyl groups, arylalkylstannyl groups, stannoxy (or "stannyloxy") groups, and the like, which in each instance have from 1 to about 20 carbon atoms.

Boron groups are boron-containing groups, which include, but are not limited to, —BR$_2$, —BX$_2$, —BRX, wherein X is a monoanionic group such as halide, hydride, alkoxide, alkyl thiolate, and the like, and wherein R in each instance is selected from alkyl, cycloalkyl, aryl, aralkyl, substituted alkyl, substituted aryl, or substituted aralkyl having from 1 to about 20 carbon atoms.

Aluminum groups are aluminum-containing groups, which include, but are not limited to, —AlR$_2$, —AlX$_2$, —AlRX, wherein X is a monoanionic group such as halide, hydride, alkoxide, alkyl thiolate, and the like, and wherein R in each instance is selected from alkyl, cycloalkyl, aryl, aralkyl, substituted alkyl, substituted aryl, or substituted aralkyl having from 1 to about 20 carbon atoms.

Examples of inorganic groups that may be used as substituents for substituted cyclopentadienyls, substituted indenyls, substituted fluorenyls, and substituted boratabenzenes include, but are not limited to, —SO$_2$X, —OAlX$_2$, —OSiX$_3$, —OPX$_2$, —SX, —OSO$_2$X, —AsX$_2$, —As(O)X$_2$, —PX$_2$, and the like, wherein X is a monoanionic group such as halide, hydride, amide, alkoxide, alkyl thiolate, and the like, and wherein any alkyl, cycloalkyl, aryl, aralkyl, substituted alkyl, substituted aryl, or substituted aralkyl group or substituent on these ligands has from 1 to about 20 carbon atoms.

Examples of organometallic groups that may be used as substituents for substituted cyclopentadienyls, substituted indenyls, and substituted fluorenyls include, but are not limited to, organoboron groups, organoaluminum groups, organogallium groups, organosilicon groups, organogermanium groups, organotin groups, organolead groups, organo-transition metal groups, and the like, having from 1 to about 20 carbon atoms.

In one aspect of this invention, (X$^2$) is independently selected from a Group-I or a Group-II ligand. When (X$^2$) is selected from a Group-I ligand, the hydrocarbyl-substituted metallocene compound includes bis($\eta^5$-cycloalkadienyl)-type compounds, including, but not limited to bis(cyclopentadienyl) compounds, bis(indenyl) compounds, bis(fluorenyl) compounds, and compounds comprising combinations of two (cyclopentadienyl)-type ligands. When (X$^2$) is selected from a Group-II ligand, the hydrocarbyl-substituted metallocene compound includes monokis(cyclopenta-dienyl) compounds, monokis(indenyl) compounds, monokis(fluorenyl) compounds, and substituted derivatives thereof.

At least one substituent on (X$^1$) or (X$^2$) can be a bridging group that connects or bridges the (X$^1$) and (X$^2$) ligands, as long as the bridging group does not prevent the catalytic activity of the catalyst composition. Examples of bridging groups include, but are not limited to, aliphatic groups, cyclic groups, combinations of aliphatic groups and cyclic groups, phosphorous groups, nitrogen groups, organometallic groups, silicon, phosphorus, boron, germanium, and the like. Examples of aliphatic groups that can serve as bridges between (X$^1$) and (X$^2$) include, but are not limited to, hydrocarbyls, such as paraffins and olefins. Examples of cyclic groups that can serve as bridges between (X$^1$) and (X$^2$) include, but are not limited to, cycloparaffins, cycloolefins, cycloacetylenes, arenes, and the like. Examples of organometallic groups that can serve as bridges between (X$^1$) and (X$^2$) include, but are not limited to, substituted silyl derivatives, substituted tin groups, substituted germanium groups, substituted boron groups, and the like. The length of the bridging group between (X$^1$) and (X$^2$) is one, two, or three atoms, wherein the one, two, or one, two, or three atoms of the bridging group are independently selected from C, Si, Ge, or Sn. In one aspect, the bridging group is a hydrocarbyl group having from 1 to about 12 carbon atoms.

In yet another aspect of this invention, the metallocene compound the metallocene compound has the following formula:

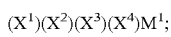

wherein $M^1$ is selected from titanium, zirconium, hafnium, or vanadium;

$(X^1)$ is selected from a cyclopentadienyl, an indenyl, a fluorenyl, a substituted cyclopentadienyl, a substituted indenyl, or a substituted fluorenyl;

wherein each substituent on the substituted cyclopentadienyl, substituted indenyl, or substituted fluorenyl $(X^1)$ is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, having from 1 to about 20 carbon atoms; a halide; or hydrogen; and $(X^2)$, $(X^3)$, and $(X^4)$ are independently selected from a hydrocarbyl group or a substituted hydrocarbyl group, having from 1 to about 20 carbon atoms.

In another aspect of this invention, the hydrocarbyl-substituted metallocene compound has the following general formula:

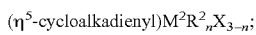

wherein cycloalkadienyl is selected from cyclopentadienyl, indenyl, fluorenyl, or substituted analogs thereof;

$M^2$ is selected from Ti, Zr, or Hf;

$R^2$ is independently selected from substituted or non-substituted alkyl, cycloalkyl, aryl, aralkyl, having from 1 to about 20 carbon atoms;

X is independently selected from F; Cl; Br; I; or substituted or non-substituted alkyl, cycloalkyl, aryl, aralkyl, alkoxide, or aryloxide having from 1 to about 20 carbon atoms; and n is an integer from 1 to 3 inclusive.

In another aspect of this invention, examples of metallocene compounds that are useful in the present invention include, but are not limited to the following compounds:

bis(cyclopentadienyl)hafnium dimethyl,

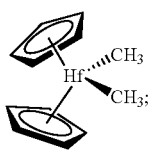

bis(cyclopentadienyl)zirconium dibenzyl,

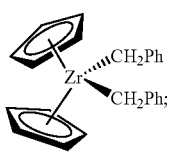

1,2-ethanediylbis($\eta^5$-1-indenyl)dimethylhafnium,

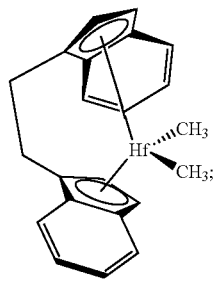

1,2-ethanediylbis($\eta^5$-1-indenyl)dimethylzirconium,

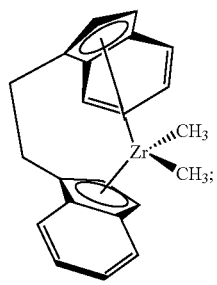

3,3-pentanediylbis($\eta^5$-4,5,6,7-tetrahydro-1-indenyl) hafnium dimethyl,

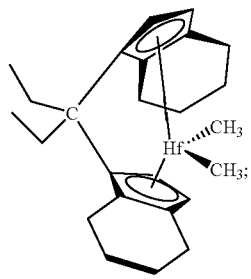

methylphenylsilylbis($\eta^5$-4,5,6,7-tetrahydro-1-indenyl)zirconium dimethyl,

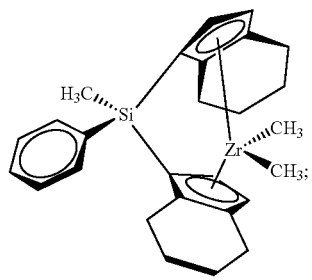

bis(1-n-butyl-3-methyl-cyclopentadienyl)zirconium dimethyl,

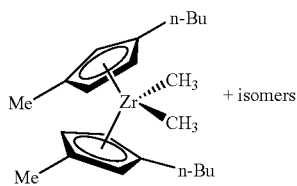

bis(n-butylcyclopentadienyl)zirconium dimethyl,

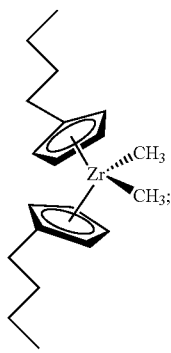

dimethylsilylbis(1-indenyl)zirconium bis(trimethylsilylmethyl),

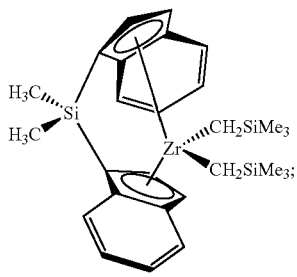

octyl(phenyl)silylbis(1-indenyl)hafnium dimethyl,

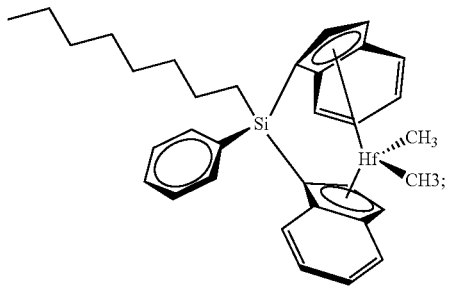

dimethylsilylbis($\eta^5$-4,5,6,7-tetrahydro-1-indenyl)zirconium dimethyl,

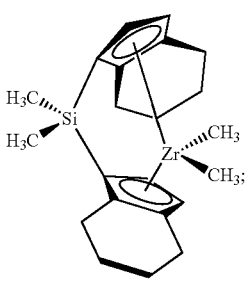

dimethylsilylbis(2-methyl-1-indenyl)zirconium dibenzyl,

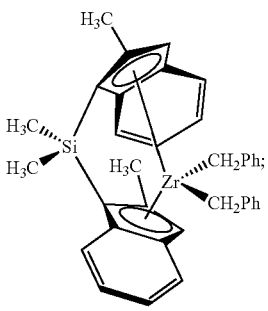

1,2-ethanediylbis(9-fluorenyl)zirconium dimethyl,

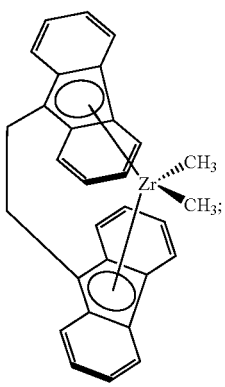

(indenyl)trisbenzyl titanium(IV),

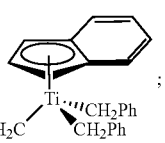

(isopropylamidodimethylsilyl)cyclopentadienyltitanium dibenzyl,

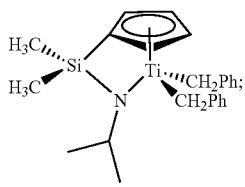

bis(pentamethylcyclopentadienyl)zirconium dimethyl,

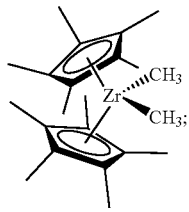

bis(indenyl)zirconium dimethyl,

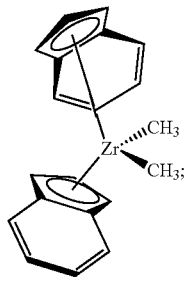

methyl(octyl)silylbis(9-fluorenyl)zirconium dimethyl,

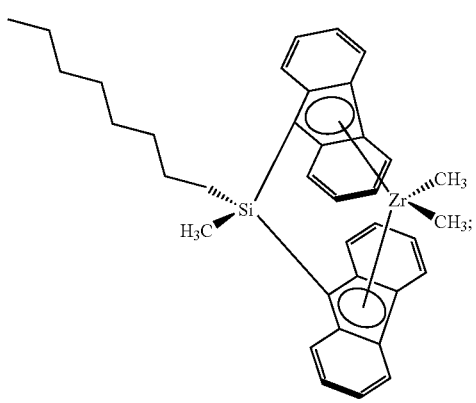

bis(2,7-di-tert-butylfluorenyl)-ethan-1,2-diyl)zirconium(IV) dimethyl,

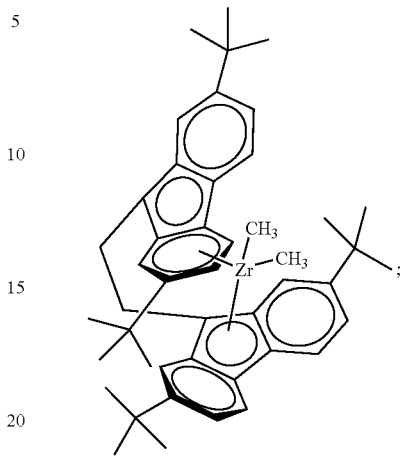

or any combination thereof.

In another aspect of this invention, the metallocene compound of the catalyst composition is selected from a compound with the formula:

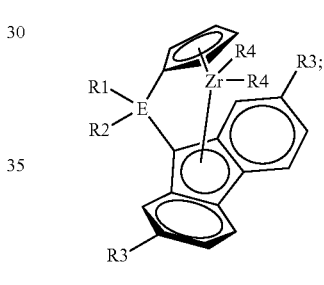

I wherein E is selected from C, Si, Ge, or Sn; R1 is selected from H or a hydrocarbyl group having from 1 to about 20 carbon atoms; R2 is selected from an alkenyl group having from about 3 to about 12 carbon atoms; and R3 is selected from H or a hydrocarbyl group having from 1 to about 12 carbon atoms; and R4 is selected from H or a hydrocarbyl group having from 1 to about 20 carbon atoms. One example of a metallocene compound according to this formula is methyl-4-pentenylmethylidene-($\eta^5$-cyclopentadienyl)($\eta^5$-9-fluorenyl)zirconium dimethyl.

Numerous processes to prepare organometal compounds that can be employed in this invention, particularly metallocenes, have been reported. For example, U.S. Pat. Nos. 4,939,217, 5,210,352, 5,436,305, 5,401,817, 5,631,335, 5,571,880, 5,191,132, 5,480,848, 5,399,636, 5,565,592, 5,347,026, 5,594,078, 5,498,581, 5,496,781, 5,563,284, 5,554,795, 5,420,320, 5,451,649, 5,541,272, 5,705,478, 5,631,203, 5,654,454, 5,705,579, and 5,668,230 describe such methods, each of which is incorporated by reference herein, in its entirety.

As used herein, hydrocarbyl-substituted metallocene compound includes monokis(cyclopentadienyl) compounds, monokis(indenyl) compounds, monokis(fluorenyl) compounds, bis(cyclopentadienyl) compounds, bis(indenyl) compounds, bis(fluorenyl) compounds, and metallocene compounds containing any combination of cyclopentadienyl, indenyl, or fluorenyl ligands, and their substituted analogs.

Further examples of such hydrocarbyl-substituted, metallocene compounds that are useful in the present invention are presented in FIG. 1.

The Chemically-Treated Solid Oxide

The present invention encompasses catalyst compositions comprising a chemically-treated solid oxide which serves as an acidic activator-support. In one aspect, the chemically-treated solid oxide comprises a solid oxide treated with an electron-withdrawing anion; wherein the solid oxide is selected from silica, alumina, silica-alumina, aluminum phosphate, heteropolytungstates, titania, zirconia, magnesia, boria, zinc oxide, mixed oxides thereof, or mixtures thereof; and wherein the electron-withdrawing anion is selected from fluoride, chloride, bromide, phosphate, triflate, bisulfate, sulfate, or any combination thereof.

The chemically-treated solid oxide includes the contact product of at least one inorganic solid oxide compound and at least one electron withdrawing anion source. It is not required that the solid oxide compound be calcined prior to contacting the electron withdrawing anion source. The contact product may be calcined either during or after the solid oxide compound is contacted with the electron withdrawing anion source. In this aspect, the solid oxide compound may be calcined or uncalcined. In another aspect, the chemically-treated solid oxide may comprise the contact product of at least one calcined solid oxide compound and at least one electron withdrawing anion source.

The chemically-treated solid oxide exhibits enhanced acidity as compared to the corresponding untreated solid oxide compound. The chemically-treated solid oxide also functions as a catalyst activator as compared to the corresponding untreated solid oxide. While not intending to be bound by theory, it is believed that the chemically-treated solid oxide may function as an ionizing solid oxide compound by completely or partially extracting an anionic ligand from the metallocene. However, the chemically-treated solid oxide is an activator regardless of whether it is ionizes the metallocene, abstracts an anionic ligand to form an ion pair, weakens the metal-ligand bond in the metallocene, simply coordinates to an anionic ligand when it contacts the chemically-treated solid oxide, or any other mechanisms by which activation may occur. While the chemically-treated solid oxide activates the metallocene in the absence of cocatalysts, it is not necessary to completely eliminate cocatalysts from the catalyst composition. The activation function of the chemically-treated solid oxide is evident in the enhanced activity of catalyst composition as a whole, as compared to a catalyst composition containing the corresponding untreated solid oxide. However, the chemically-treated solid oxide functions as an activator, even in the absence of organoaluminum compound, aluminoxanes, organoborates, or ionizing ionic compounds.

In one aspect, the chemically-treated solid oxide of this invention comprises a solid inorganic oxide material, a mixed oxide material, or a combination of inorganic oxide materials, that is chemically-treated with an electron-withdrawing component, and optionally treated with a metal. Thus, the treated of this invention encompasses oxide materials such as alumina, "mixed oxide" compounds thereof such as silica-alumina, and combinations and mixtures thereof. The "mixed oxide" compounds such as silica-alumina single chemical phases with more than one metal combined with oxygen to form a solid oxide compound, and are encompassed by this invention.

In one aspect of this invention, the chemically-treated solid oxide further comprises a metal or metal ion selected from zinc, nickel, vanadium, silver, copper, gallium, tin, tungsten, molybdenum, or any combination thereof. Examples, of chemically-treated solid oxides that further comprise a metal or metal ion include, but are not limited to, zinc-impregnated chlorided alumina, zinc-impregnated fluorided alumina, zinc-impregnated chlorided silica-alumina, zinc-impregnated fluorided silica-alumina, zinc-impregnated sulfated alumina, or any combination thereof.

In another aspect, the chemically-treated solid oxide of this invention comprises a solid inorganic oxide of relatively high porosity, which exhibits Lewis acidic or Brønsted acidic behavior. The inorganic oxide is chemically-treated with an electron-withdrawing component, typically an electron-withdrawing anion, to form a chemically-treated solid oxide. While not intending to be bound by the following statement, it is believed that treatment of the inorganic oxide with an electron-withdrawing component augments or enhances the acidity of the oxide. Thus, the chemically-treated solid oxide exhibits Lewis or Brønsted acidity which is typically greater than the Lewis or Brønsted acidity of the untreated solid inorganic oxide. One method to quantify the acidity of the chemically-treated and untreated solid oxide materials is by comparing the polymerization activities of the treated and untreated oxides under acid catalyzed reactions.

Typically, the chemically-treated solid oxide comprises a solid inorganic oxide comprising oxygen and at least one element selected from Group 2, 3, 4, 5, 6, 7, 8, 9, 10, 11, 12, 13, 14, or 15 of the periodic table, or comprising oxygen and at least one element selected from the lanthanide or actinide elements. (See: *Hawley's Condensed Chemical Dictionary*, 11$^{th}$ Ed., John Wiley & Sons; 1995; Cotton, F. A.; Wilkinson, G.; Murillo; C. A.; and Bochmann; M. *Advanced Inorganic Chemistry*, 6$^{th}$ Ed., Wiley-Interscience, 1999.) Usually, the inorganic oxide comprises oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn or Zr.

Suitable examples of solid oxide materials or compounds that can be used in the chemically-treated solid oxide of the present invention include, but are not limited to, $Al_2O_3$, $B_2O_3$, BeO, $Bi_2O_3$, CdO, $Co_3O_4$, $Cr_2O_3$, CUO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. Examples of mixed oxides that can be used in the chemically-treated solid oxide of the present invention include, but are not limited to, silica-alumina, silica-titania, silica-zirconia, zeolites, clays, alumina-titania, alumina-zirconia, aluminum phosphate, heteropolytungstates, and the like.

Typically, the solid oxide material is chemically-treated by contacting it with at least one electron-withdrawing anion source, and optionally chemically-treated with a metal ion, then calcining to form a chemically-treated solid oxide, or "activator-support". Alternatively, a solid oxide material and an electron-withdrawing anion source are contacted and calcined simultaneously. The method by which the oxide is contacted with an electron-withdrawing component, typically a salt or an acid of an electron-withdrawing anion, includes, but is not limited to, gelling, co-gelling, impregnation of one compound onto another, and the like. Typically, following any contacting method, the contacted mixture of oxide compound, electron-withdrawing anion, and optionally the metal ion is calcined.

The electron-withdrawing component used to treat the oxide is any component that increases the Lewis or Brønsted acidity of the solid oxide upon treatment. Typically, the electron-withdrawing component is an electron-withdrawing anion derived from a salt, an acid, or other compound such as a volatile organic compound that may serve as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, trifluoroacetate, triflate, and the like, including mixtures and combinations thereof. In addition, other ionic or non-ionic compounds that serve as sources for these electron withdrawing anions may also be employed in the present invention.

When the electron-withdrawing component comprises a salt of an electron-withdrawing anion, the counterion or cation of that salt may be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron withdrawing anions, in varying proportions, can be used to tailor the specific acidity of the chemically-treated solid oxide to the desired level. Combinations of electron withdrawing components may be contacted with the oxide material simultaneously or individually, and any order that affords the desired chemically-treated solid oxide acidity.

Once the solid oxide has been chemically-treated and dried, it is subsequently calcined. Calcining of the chemically-treated solid oxide is generally conducted in an ambient atmosphere, typically in a dry ambient atmosphere, at a temperature from about 200° C. to about 900° C., and for a time of about 1 minute to about 100 hours. More typically, calcining is conducted at a temperature from about 300° C. to about 800° C. and most typically in a range of 400° C. to 700° C. Also more typically, calcining is conducted from about 1 hour to about 50 hours, and most typically, from about 3 hours to about 20 hours. When the chemically-treated solid oxide is fluorided silica-alumina, most typically, calcining is carried out from about 1 to about 10 hours at a temperature from about 350° C. to about 550° C.

Further, any type of suitable ambient atmosphere can be used during calcining. Generally, calcining is conducted in an oxidizing atmosphere, such as air. Alternatively, an inert atmosphere, such as nitrogen or argon, or a reducing atmosphere such as hydrogen or carbon monoxide, may be used.

The solid oxide component used to prepare the chemically-treated solid oxide typically has a pore volume greater than about 0.1 cc/g, more typically greater than about 0.5 cc/g, and most typically greater than 1.0 cc/g. The solid oxide component typically has a surface area in a range of about 100 to about 1000 $m^2/g$, more typically from about 200 to about 800 $m^2/g$, and most typically, from 250 to 600 $m^2/g$.

Typically, the solid oxide material is chemically-treated with a source of halide ion or sulfate ion, or a combination of anions, and optionally chemically-treated with a metal ion, then calcined to provide the chemically-treated solid oxide in the form of a particulate solid. Thus, the chemically-treated solid oxide component is generally selected from a halided or sulfated solid oxide component, a halided or a sulfated metal-containing solid oxide component, or a combination thereof. In one aspect of this invention, the chemically-treated solid oxide is selected from chemically-treated alumina, chemically-treated silica-alumina, or mixtures thereof. In one aspect, the chemically-treated solid oxide is selected from fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, or any combination thereof, each optionally having been chemically-treated with a metal ion. More typically, the chemically-treated metal oxide is selected from chlorided zinc-alumina, sulfated alumina, fluorided silica-alumina, or any combination thereof.

In one aspect of this invention, the chemically-treated oxide comprises a fluorided solid oxide in the form of a particulate solid, thus a source of fluoride ion is added to the oxide by treatment with a fluoriding agent. Typically, fluoride ion may be added to the oxide by forming a slurry of the oxide in a suitable solvent such as alcohol or water, including, but are not limited to, the one to three carbon alcohols because of their volatility and low surface tension. Examples of fluoriding agents that can be used in this invention include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), analogs thereof, and combinations thereof. For example, ammonium bifluoride $NH_4HF_2$ is used as the fluoriding agent, due to its ease of use and ready availability.

In another aspect of the present invention, the solid oxide can be chemically-treated with a fluoriding agent during the calcining step. Any fluoriding agent capable of thoroughly contacting the solid oxide during the calcining step can be used. For example, in addition to those fluoriding agents described previously, volatile organic fluoriding agents may be used. Examples of volatile organic fluoriding agents useful in this aspect of the invention include, but are not limited to, freons, perfluorohexane, perfluorobenzene, fluoromethane, trifluoroethanol, and combinations thereof. Gaseous hydrogen fluoride or fluorine itself can also be used with the solid oxide is fluorided during calcining. One convenient method of contacting the solid oxide with the fluoriding agent is to vaporize a fluoriding agent into a gas stream used to fluidize the solid oxide during calcination.

Similarly, in another aspect of this invention, the chemically-treated solid oxide comprises a chlorided solid oxide in the form of a particulate solid, thus a source of chloride ion is added to the oxide by treatment with a chloriding agent. The chloride ion may be added to the oxide by forming a slurry of the oxide in a suitable solvent. In another aspect of the present invention, the solid oxide can be chemically-treated with a chloriding agent during the calcining step. Any chloriding agent capable of serving as a source of chloride and thoroughly contacting the oxide during the calcining step can be used. For example, volatile organic choriding agents may be used. Examples of volatile organic choriding agents useful in this aspect of the invention include, but are not limited to, certain freons, perchlorobenzene, chloromethane, dichloromethane, chloroform, carbon tetrachloride, and combinations thereof. Gaseous hydrogen chloride or chlorine itself can also be used with the solid oxide during calcining. One convenient method of contacting the oxide with the chloriding agent is to vaporize a chloriding agent into a gas stream used to fluidize the solid oxide during calcination.

The amount of fluoride or chloride ion present before calcining the solid oxide is generally from about 2 to about 50% by weight, typically from about 3 to about 25% by weight, and more typically from about 4 to about 20% by weight, where the weight percents are based on the weight of the solid oxide, for example silica-alumina, before calcining. If the fluoride or chloride ion are added during calcining, such as when calcined in the presence of CCl$_4$, there is typically no fluoride or chloride ion in the solid oxide before calcining. Once impregnated with halide, the halided oxide may be dried by any method known in the art including, but not limited to, suction filtration followed by evaporation, drying under vacuum, spray drying, and the like, although it is also possible to initiate the calcining step immediately.

The silica-alumina used to prepare the chemically-treated silica-alumina typically has a pore volume greater than about 0.5 cc/g, more typically greater than about 0.8 cc/g, and most typically, greater than 1.0 cc/g. Further, the silica-alumina typically has a surface area greater than about 100 m$^2$/g, more typically greater than about 250 m$^2$/g, and most typically greater than 350 m$^2$/g. Generally, the silica-alumina of this invention has an alumina content from about 5 to about 95%, typically from about 5 to about 50%, and more typically from 8% to 30% alumina by weight.

The sulfated solid oxide comprises sulfate and a solid oxide component such as alumina or silica-alumina, in the form of a particulate solid. Optionally, the sulfated oxide is further chemically-treated with a metal ion such that the calcined sulfated oxide comprises a metal. Typically, the sulfated solid oxide comprises sulfate and alumina. In one aspect of this invention, the sulfated alumina is formed by a process wherein the alumina is chemically-treated with a sulfate or bisulfate source, typically selected from, but not limited to, sulfuric acid, ammonium sulfate, or ammonium bisulfate.

In addition to being chemically-treated with an electron-withdrawing component such as halide or sulfate ion, the solid inorganic oxide of this invention may optionally be chemically-treated with a metal source, including metal salts or metal-containing compounds. Typically, these compounds are added to or impregnated onto the solid inorganic oxide in solution form, and subsequently converted into the supported metal upon calcining. Accordingly, the solid inorganic oxide can further comprise a metal selected from zinc, nickel, vanadium, silver, copper, gallium, tin, tungsten, molybdenum, or a combination thereof. Typically, for good catalyst activity and low cost, zinc is used to impregnate the solid oxide. The solid oxide may be chemically-treated with metal salts or metal-containing compounds before, after, or at the same time that the solid oxide is chemically-treated with the electron withdrawing anion.

Further, any method of impregnating the solid oxide material with a metal may be used. The method by which the oxide is contacted with a metal source, typically a salt or metal-containing compound, includes, but is not limited to, gelling, co-gelling, impregnation of one compound onto another, and the like. Following any contacting method, the contacted mixture of oxide compound, electron-withdrawing anion, and the metal ion is typically calcined. Alternatively, a solid oxide material, an electron-withdrawing anion source, and the metal salt or metal-containing compound are contacted and calcined simultaneously.

The preparation of the chemically-treated solid oxides is described in U.S. Pat. Nos. 6,107,230, 6,300,271, 6,316,553, 6,355,594, 6,376,415, 6,391,816, and 6,395,666, each of which is incorporated herein in by reference its the entirety.

Catalyst Composition—The Optional Cocatalyst

In addition to the metallocene compound and the chemically-treated solid oxide disclosed herein, the catalyst composition of this invention optionally comprises a cocatalyst. Thus, it is not necessary for the catalyst composition to include a cocatalyst. When used, the optional cocatalyst is typically selected from an organoaluminum compound, an aluminoxane, an organozinc compound, an organoboron compound, an ionizing ionic compound, a clay material, or any combination thereof. In one aspect, the catalyst composition further comprises an optional clay material, selected from clays and other natural and synthetic layered oxides, cogelled clay matrices containing silica or other oxides, pillared clays, zeolites, clay minerals, other layered minerals, or combinations thereof, including but not limited to ion exchangeable layered minerals (natural or synthetic) or composites made from such compounds, or any combinations thereof, regardless of whether the layered structure remains intact or not. The cocatalyst may further comprise a combination or mixture of any of these cocatalysts, including any mixture of these clay materials.

The Optional Organoaluminum Compound

The present invention provides catalyst compositions comprising one or more hydrocarbyl-substituted metallocenes, a chemically-treated solid oxide, and an optional cocatalyst component. In one aspect, the cocatalyst of this invention comprises at least one organoaluminum compound. Thus, the present invention provides catalyst compositions and methods to prepare a catalyst composition comprising contacting a hydrocarbyl-substituted metallocene and a chemically-treated solid oxide, and an optional organoaluminum compound. One aspect of this invention involves the use of some organoaluminum compound to precontact the other catalyst components prior to introducing the catalyst into the polymerization reactor, and the balance of the organoaluminum compound to be introduced directly into the polymerization reactor. It is not required that the same organoaluminum compound used in the optional precontact step with the other catalyst components is the same as the organoaluminum compound introduced directly into the polymerization reactor.

In one aspect, the optional organoaluminum compounds include, but are not limited to compounds having the following general formula:

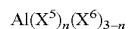

wherein (X$^5$) is a hydrocarbyl having from 1 to about 20 carbon atoms. Typically, (X$^5$) is an alkyl having from 2 to about 10 carbon atoms, and more typically, (X$^5$) is selected from ethyl, propyl, n-butyl, sec-butyl, isobutyl, hexyl, and the like.

The substituent (X$^6$) in the above formula is selected from halide, hydride, alkoxide, aryloxide, and the like. Typically, (X$^6$) is independently selected from fluoro or chloro, and more typically, (X$^6$) is chloro.

In the formula Al(X$^5$)$_n$(X$^6$)$_{3-n}$, n is a number from 1 to 3 inclusive, and typically, n is 3. The value of n is not restricted to be an integer, therefore this formula includes sesquihalide compounds.

Generally, examples of organoaluminum compounds that can be used in this invention include, but are not limited to, trialkylaluminum compounds, dialkylaluminium halide compounds, alkylaluminum dihalide compounds, alkylaluminum sesquihalide compounds, and combinations thereof. Specific examples of organoaluminum compounds that can be used in this invention in the precontacted mixture with the organometal compound and an olefin or acetylene monomer include, but are not limited to, trimethylaluminum (TMA); triethylaluminum (TEA); tripropylaluminum; diethylaluminum ethoxide; tributylaluminum; disobutylaluminum hydride; triisobutylaluminum (TIBAL); and diethylaluminum chloride.

One aspect of this invention involves the use of some organoaluminum compound is to precontact the other catalyst components prior to introducing the catalyst into the polymerization reactor, and the balance of the organoaluminum compound to be introduced directly into the polymerization reactor. The amounts of organoaluminum compound disclosed herein include the total amount of organoaluminum compound used in an optional precontact step, and any additional organoaluminum compound added to the polymerization reactor. In one aspect, the weight ratio of the organoalumium compound to the chemically-treated solid oxide is from about 10:1 to about 1:1,000 in the catalyst composition. Triethylaluminum (TEA) and triisobutylaluminum (TIBAL) are typical compounds used in this aspect of this invention.

The Optional Aluminoxane Cocatalyst

The present invention provides catalyst compositions comprising one or more hydrocarbyl-substituted metallocenes, a chemically-treated solid oxide, and an optional cocatalyst component. In one aspect, the cocatalyst of this invention comprises at least one aluminoxane cocatalyst. Aluminoxanes are also referred to as poly(hydrocarbyl aluminum oxides). The other catalyst components are typically contacted with the aluminoxane in a saturated hydrocarbon compound solvent, though any solvent which is substantially inert to the reactants, intermediates, and products of the activation step can be used. The catalyst composition formed in this manner may be collected by methods known to those of skill in the art, including but not limited to filtration, or the catalyst composition may be introduced into the polymerization reactor without being isolated.

The aluminoxane compound of this invention is an oligomeric aluminum compound, wherein the aluminoxane compound can comprise linear structures, cyclic, or cage structures, or typically mixtures of all three. Cyclic aluminoxane compounds having the formula:

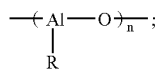

wherein

R is a linear or branched alkyl having from 1 to 10 carbon atoms, and n is an integer from 3 to about 10 are encompassed by this invention. The (AlRO)$_n$ moiety shown here also constitutes the repeating unit in a linear aluminoxane. Thus, linear aluminoxanes having the formula:

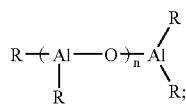

wherein

R is a linear or branched alkyl having from 1 to 10 carbon atoms, and n is an integer from 1 to about 50, are also encompassed by this invention.

Further, aluminoxanes may also have cage structures of the formula $R^t{}_{5m+\alpha}R^b{}_{m-\alpha}Al_{4m}O_{3m}$, wherein m is 3 or 4 and $\alpha$ is $=n_{Al(3)}-n_{O(2)}+n_{O(4)}$; wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ represents a terminal alkyl group, and $R^b$ represents a bridging alkyl group; wherein R is a linear or branched alkyl having from 1 to 10 carbon atoms.

Thus, aluminoxanes that can serve as optional cocatalysts in this invention are generally represented by formulas such as $(R-Al-O)_n$, $R(R-Al-O)_nAlR_2$, and the like, wherein the R group is typically a linear or branched $C_1$-$C_6$ alkyl such as methyl, ethyl, propyl, butyl, pentyl, or hexyl wherein n typically represents an integer from 1 to about 50. In one embodiment, the aluminoxane compounds of this invention include, but are not limited to, methylaluminoxane, ethylaluminoxane, n-propylaluminoxane, iso-propylaluminoxane, n-butylaluminoxane, t-butyl-aluminoxane, sec-butylaluminoxane, iso-butylaluminoxane, 1-pentylaluminoxane, 2-pentylaluminoxane, 3-pentylaluminoxane, iso-pentylaluminoxane, neopentylaluminoxane, or combinations thereof.

While organoaluminoxanes with different types of R groups are encompassed by the present invention, methyl aluminoxane (MAO), ethyl aluminoxane, or isobutyl aluminoxane are typical optional cocatalysts used in the catalyst compositions of this invention. These aluminoxanes are prepared from trimethylaluminum, triethylaluminum, or triisobutylaluminum, respectively, and are sometimes referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as disclosed in U.S. Pat. No. 4,794,096, which is herein incorporated by reference in its entirety.

The present invention contemplates many values of n in the aluminoxane formulas $(R-Al-O)_n$ and $R(R-Al-O)_nAlR_2$, and preferably n is at least about 3. However, depending upon how the organoaluminoxane is prepared, stored, and used, the value of n may be variable within a single sample of aluminoxane, and such a combination of organoaluminoxanes are comprised in the methods and compositions of the present invention.

In preparing the catalyst composition of this invention comprising an optional aluminoxane, the molar ratio of the aluminum in the alumixoane to the hydrocarbyl-substituted metallocene in the composition is usually from about 1:10 to about 100,000:1. In one another aspect, the molar ratio of the aluminum in the alumixoane to the hydrocarbyl-substituted metallocene in the composition is usually from about 5:1 to about 15,000:1. The amount of optional aluminoxane added to a polymerization zone is an amount within a range of about 0.01 mg/L to about 1000 mg/L, from about 0.1 mg/L to about 100 mg/L, or from about 1 mg/L to abut 50 mg/L.

Organoaluminoxanes can be prepared by various procedures which are well known in the art. Examples of organoaluminoxane preparations are disclosed in U.S. Pat. Nos. 3,242,099 and 4,808,561, each of which is incorporated by reference herein, in its entirety. One example of how an aluminoxane may be prepared is as follows. Water which is dissolved in an inert organic solvent may be reacted with an aluminum alkyl compound such as $AlR_3$ to form the desired organoaluminoxane compound. While not intending to be bound by this statement, it is believed that this synthetic method can afford a mixture of both linear and cyclic $(R-Al-O)_n$ aluminoxane species, both of which are encompassed by this invention. Alternatively, organoaluminoxanes may be prepared by reacting an aluminum alkyl compound such as $AlR_3$ with a hydrated salt, such as hydrated copper sulfate, in an inert organic solvent.

The Optional Organozinc Cocatalysts

The present invention provides catalyst compositions comprising one or more hydrocarbyl-substituted metallocenes, a chemically-treated solid oxide, and an optional cocatalyst component. In one aspect, the cocatalyst of this invention comprises at least one organozinc compound.

In one aspect, the catalyst composition further comprises an optional organozinc cocatalyst, selected from a compound with the following formula:

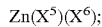

$Zn(X^5)(X^6)$;

wherein $(X^5)$ is a hydrocarbyl having from 1 to about 20 carbon atoms; $(X^6)$ is selected from a hydrocarbyl, an alkoxide or an aryloxide having from 1 to about 20 carbon atoms, halide, or hydride. In another aspect, the optional organozinc cocatalyst is selected from dimethylzinc, diethylzinc, dipropylzinc, dibutylzinc, dineopentylzinc, di(trimethylsilylmethyl)zinc, and the like, including any combinations thereof.

The Optional Organoboron Cocatalysts

The present invention provides catalyst compositions comprising one or more hydrocarbyl-substituted metallocenes, a chemically-treated solid oxide, and an optional cocatalyst component. In one aspect, the cocatalyst of this invention comprises at least one organoboron compound.

In one aspect, the organoboron compound comprises neutral boron compounds, borate salts, or combinations thereof. For example, the organoboron compounds of this invention can comprise a fluoroorgano boron compound, a fluoroorgano borate compound, or a combination thereof. Any fluoroorgano boron or fluoroorgano borate compound known in the art can be utilized. The term fluoroorgano boron compounds has its usual meaning to refer to neutral compounds of the form $BY_3$. The term fluoroorgano borate compound also has its usual meaning to refer to the monoanionic salts of a fluoroorgano boron compound of the form $[cation]^+[BY_4]^-$, where Y represents a fluorinated organic group. For convenience, fluoroorgano boron and fluoroorgano borate compounds are typically referred to collectively by organoboron compounds, or by either name as the context requires.

Examples of fluoroorgano borate compounds that can be used as cocatalysts in the present invention include, but are not limited to, fluorinated aryl borates such as, N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, and the like, including mixtures thereof. Examples of fluoroorgano boron compounds that can be used as cocatalysts in the present invention include, but are not limited to, tris(pentafluorophenyl)boron, tris[3,5-bis(trifluoromethyl)phenyl]boron, and the like, including mixtures thereof.

Although not intending to be bound by the following theory, these examples of fluoroorgano borate and fluoroorgano boron compounds, and related compounds, are thought to form "weakly-coordinating" anions when combined with organometal compounds, as disclosed in U.S. Pat. No. 5,919,983, which is incorporated herein by reference in its entirety.

Generally, any amount of organoboron compound can be utilized in this invention. In one aspect, the molar ratio of the organoboron compound to the metallocene compound in the composition is from about 0.1:1 to about 10:1. Typically, the amount of the fluoroorgano boron or fluoroorgano borate compound used as a cocatalyst for the hydrocarbyl-substituted metallocene is in a range of from about 0.5 mole to about 10 moles of boron compound per mole of metallocene compound. In one aspect, the amount of fluoroorgano boron or fluoroorgano borate compound used as a cocatalyst for the hydrocarbyl-substituted metallocene is in a range of from about 0.8 mole to about 5 moles of boron compound per mole of metallocene compound.

The Optional Ionizing Ionic Compound

The present invention provides catalyst compositions comprising one or more hydrocarbyl-substituted metallocenes, a chemically-treated solid oxide, and an optional cocatalyst component. In one aspect, the cocatalyst of this invention comprises at least one ionizing ionic compound.

An ionizing ionic compound is an ionic compound which can function to enhance activity of the catalyst composition. While not bound by theory, it is believed that the ionizing ionic compound may be capable of reacting with the metallocene compound and converting the metallocene into a cationic metallocene compound. Again, while not intending to be bound by theory, it is believed that the ionizing ionic compound may function as an ionizing compound by completely or partially extracting an anionic ligand, possibly a non-$\eta^5$-alkadienyl ligand such as $(X^3)$ or $(X^4)$, from the metallocene. However, the ionizing ionic compound is an activator regardless of whether it is ionizes the metallocene, abstracts an $(X^3)$ or $(X^4)$ ligand in a fashion as to form an ion pair, weakens the metal-$(X^3)$ or metal-$(X^4)$ bond in the metallocene, simply coordinates to an $(X^3)$ or $(X^4)$ ligand, or any other mechanisms by which activation may occur. Further, it is not necessary that the ionizing ionic compound activate the metallocene only. The activation function of the ionizing ionic compound is evident in the enhanced activity of catalyst composition as a whole, as compared to a catalyst composition containing catalyst composition that does not comprise any ionizing ionic compound.

Examples of ionizing ionic compounds include, but are not limited to, the following compounds: tri(n-butyl)ammonium tetrakis(p-tolyl)borate, tri(n-butyl)ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis(trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, triphenylcarbenium tetrakis[3,5-bis(trifluoromethyl)phenyl]borate, triphenylcarbenium tetrakis(pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl]borate, tropylium tetrakis(pentafluorophenyl)borate, lithium tetrakis(pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis-(pentafluorophenyl)borate, potassium tetraphenylborate, potassium tetrakis(p-tolyl)borate, potassium tetrakis(m-tolyl)borate, potassium tetrakis(2,4-dimethyl-phenyl)borate, potassium tetrakis(3,5-dimethylphenyl)borate, potassium tetrafluoroborate, tri(n-butyl)ammonium tetrakis(p-tolyl)aluminate, tri(n-butyl)ammonium tetrakis(m-tolyl)aluminate, tri(n-butyl)ammonium tetrakis(2,4-dimethylphenyl)aluminate, tri(n-butyl)ammonium tetrakis(3,5-dimethylphenyl)aluminate, tri (n-butyl)ammonium tetrakis(pentafluorophenyl)aluminate, N,N-dimethylanilinium tetrakis(p-tolyl)-aluminate, N,N-dimethylanilinium tetrakis(m-tolyl)aluminate, N,N-dimethylanilinium tetrakis(2,4-dimethylphenyl)aluminate, N,N-dimethylanilinium tetrakis(3,5-dimethyl-phenyl)aluminate, N,N-dimethylanilinium tetrakis(pentafluorophenyl)aluminate, triphenylcarbenium tetrakis(p-tolyl)aluminate, triphenylcarbenium tetrakis(m-tolyl)-aluminate, triphenylcarbenium tetrakis(2,4-dimethylphenyl)aluminate, triphenylcarbenium tetrakis(3,5-dimethylphenyl)aluminate, triphenylcarbenium tetrakis-(pentafluorophenyl)aluminate, tropylium tetrakis(p-tolyl)aluminate, tropylium tetrakis(m-tolyl)aluminate, tropylium tetrakis(2,4-dimethylphenyl)aluminate, tropylium tetrakis(3,5-dimethylphenyl)aluminate, tropylium tetrakis(pentafluorophenyl)aluminate, lithium tetrakis(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl) aluminate, lithium tetrakis(3,5-dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl) aluminate, potassium tetrakis(m-tolyl)-aluminate, potassium tetrakis(2,4-dimethylphenyl)aluminate, potassium tetrakis (3,5-dimethylphenyl)aluminate, potassium tetrafluoroaluminate. However, the ionizing ionic compound is not limited thereto in the present invention.

The Olefin Monomer

Unsaturated reactants that are useful in the polymerization processes with catalyst compositions and processes of this invention include olefin compounds having from about 2 to about 30 carbon atoms per molecule and having at least one olefinic double bond. This invention encompasses homopolymerization processes using a single olefin such as ethylene or propylene, as well as copolymerization reactions with at least one different olefinic compound. Typically, copolymers of ethylene comprise a major amount of ethylene (>50 mole percent) and a minor amount of comonomer <50 mole percent), though this is not a requirement. The comonomers that can be copolymerized with ethylene should have from three to about 20 carbon atoms in their molecular chain.

When a copolymer is desired, the monomer ethylene is typically copolymerized with a comonomer typically, but not necessarily, selected from 1-butene, 1-pentene, 1-hexene, 1-octene, 1-decene or styrene. The amount of comonomer introduced into a reactor zone to produce the copolymer is generally from about 0.01 to about 10 weight percent comonomer based on the total weight of the monomer and comonomer. More typically, the amount of comonomer introduced into a reactor zone is from about 0.01 to about 5 weight percent comonomer, and most typically from about 0.1 to about 4 weight percent comonomer based on the total weight of the monomer and comonomer. Alternatively, an amount sufficient to give the above described concentrations by weight, in the copolymer produced can be used.

Acyclic, cyclic, polycyclic, terminal ($\alpha$), internal, linear, branched, substituted, unsubstituted, functionalized, and non-functionalized olefins may be employed in this invention. For example, typical unsaturated compounds that can be polymerized with the catalysts of this invention include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, the five normal decenes, and mixtures of any two or more thereof. Cyclic and bicyclic olefins, including but not limited to, cyclopentene, cyclohexene, norbornylene, norbornadiene, and the like, may also be polymerized as described above.

While not intending to be bound by this theory, in the event that branched, substituted, or functionalized olefins are used as reactants, it is believed that steric hindrance may impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. Typically, at least one reactant for the catalyst compositions of this invention is ethylene, so the polymerizations are either homopolymerizations or copolymerizations with a different acyclic, cyclic, terminal, internal, linear, branched, substituted, or unsubstituted olefin. In addition, the catalyst compositions of this invention may be used in polymerization of diolefin compounds, including but are not limited to, 1,3-butadiene, isoprene, 1,4-pentadiene, and 1,5-hexadiene.

Preparation of the Catalyst Composition

In accordance with this invention, the catalyst compositions were prepared by a process comprising contacting various combinations of at least one hydrocarbyl-substituted metallocene with at least one chemically-treated solid oxide for an effective period of time, prior to using this catalyst composition in the polymerization process. Active catalysts could be prepared by any method and any order of contacting the various components. The contact process of preparing the catalyst of this invention typically occurs in an inert atmosphere and under substantially anhydrous conditions. Thus, the atmosphere is typically substantially oxygen-free and substantially free of water as the reaction begins, to prevent deactivation of the catalyst. This contacting procedure can occur in a variety of ways including, but not limited to, blending or mixing. Further, each of the catalyst composition components can be fed into the reactor separately. When using optional cocatalysts, various combinations of these compounds can be contacted together prior to being further contacted with additional catalyst components, or all compounds can be contacted together before being introduced into the reactor.

In one aspect of this invention, the catalyst composition is prepared by contacting the metallocene compound and the chemically-treated solid oxide component to form a first mixture, and then optionally contacting this first mixture with a cocatalyst, for example an organoaluminum compound, to form a second mixture comprising the catalyst composition. In the first mixture, the metallocene compound and the chemically-treated solid oxide component are typically contacted for about 1 minute to about 24 hours at a temperature from about 10° C. to about 100° C., more typically from about 1 minute to about 1 hour at a temperature from about 15° C. to about 50° C. The components of the second mixture are typically contacted for about 1 minute to about 24 hours at a temperature from about 10° C. to about 100° C., more typically from about 1 minute to about 1 hour at a temperature from about 15° C. to about 50° C., prior to initiating the polymerization reaction.

In another aspect of this invention, the catalyst composition is prepared by contacting the metallocene compound and a cocatalyst, for example an organoaluminum compound, to form a first mixture, and then contacting this first mixture with the chemically-treated solid oxide component to form a second mixture comprising the catalyst composition. In the first mixture, the metallocene compound and the cocatalyst are typically contacted for about 1 minute to about 24 hours at a temperature from about 10° C. to about 100° C., more typically from about 1 minute to about 1 hour at a temperature from about 15° C. to about 50° C. The components of the second mixture are typically contacted for about 1 minute to about 24 hours at a temperature from about 10° C. to about 100° C., more typically from about 1 minute to about 1 hour at a temperature from about 15° C. to about 50° C., prior to initiating the polymerization reaction.

In another aspect of this invention, the catalyst composition is prepared by contacting the metallocene compound and the chemically-treated solid oxide component before injection into a polymerization reactor. In this aspect, the metallocene and the chemically-treated oxide are contacted in the absence of cocatalyst for a period from about 1 minute to about 24 hours, typically from about 1 minute to abut 1 hour, and at a temperature from about 10° C. to about 200° C., typically from about 20° C. to about 80° C.

One aspect of this invention is contacting a hydrocarbyl-substituted metallocene such as $(\eta^5-C_5H_5)Zr(CH_2Ph)_3$ with an organoaluminum compound such as $Al(isobutyl)_3$ for about 30 minutes to form a first mixture, prior to contacting this first mixture with an acidic, chemically-treated solid oxide such as chlorided zinc-alumina to form a second mixture. Once the second mixture of all the catalyst components is formed, it is optionally allowed to remain in contact from about 1 minute to about 24 hours prior to using this second mixture in a polymerization process.

When an optional cocatalyst is used, the weight ratio of the cocatalyst compound to the chemically-treated solid oxide component in the catalyst composition ranges from about 5:1 to about 1:1000, typically from about 3:1 to about 1:100, and more typically from 1:1 to 1:50. These weight ratios are based on the combined weights of cocatalyst, the chemically-treated solid oxide, and the metallocene used to prepare the catalyst composition, regardless of the order of contacting the catalyst components.

The weight ratio of the chemically-treated solid oxide component to the metallocene compound in the catalyst composition ranges from about 10,000:1 to about 1:1, preferably, from about 1000:1 to about 10:1, and most preferably, from 250:1 to 20:1. These weight ratios are based on the combined weights of any optional cocatalyst employed, the chemically-treated solid oxide, and the metallocene used to prepare the catalyst composition, regardless of the order of contacting the catalyst components.

Utility of the Catalyst Composition in Polymerization Processes

Polymerizations using the catalysts of this invention can be carried out in any manner known in the art. Such polymerization processes include, but are not limited to slurry polymerizations, gas phase polymerizations, solution polymerizations, and the like, including multi-reactor combinations thereof. Thus, any polymerization zone known in the art to produce ethylene-containing polymers can be utilized. For example, a stirred reactor can be utilized for a batch process, or the reaction can be carried out continuously in a loop reactor or in a continuous stirred reactor.

After catalyst activation, a catalyst composition is used to homopolymerize ethylene, or copolymerize ethylene with a comonomer. A typical polymerization method is a slurry polymerization process (also known as the particle form process), which are well known in the art and are disclosed, for example in U.S. Pat. No. 3,248,179, which is incorporated by reference herein, in its entirety. Other polymerization methods of the present invention for slurry processes are those employing a loop reactor of the type disclosed in U.S. Pat. No. 3,248,179, and those utilized in a plurality of stirred reactors either in series, parallel, or combinations thereof, wherein the reaction conditions are different in the different reactors, which is also incorporated by reference herein, in its entirety.

Polymerization temperature for this invention typically ranges from about 60° C. to about 280° C., with a polymerization reaction temperature more typically operating between about 70° C. to about 110° C.

The polymerization reaction typically occurs in an inert atmosphere, that is, in atmosphere substantial free of oxygen and under substantially anhydrous conditions, thus, in the absence of water as the reaction begins. Therefore a dry, inert atmosphere, for example, dry nitrogen or dry argon, is typically employed in the polymerization reactor.

The polymerization reaction pressure can be any pressure that does not adversely affect the polymerization reaction, and it typically conducted at a pressure higher than the pretreatment pressures. Generally, polymerization pressures are from about atmospheric pressure to about 1000 psig, more typically from about 50 psig to about 800 psig. Further, hydrogen can be used in the polymerization process of this invention to control polymer molecular weight.

Polymerizations using the catalysts of this invention can be carried out in any manner known in the art. Such processes that can polymerize monomers into polymers include, but are not limited to slurry polymerizations, gas phase polymerizations, solution polymerizations, and multi-reactor combinations thereof. Thus, any polymerization zone known in the art to produce olefin-containing polymers can be utilized. For example, a stirred reactor can be utilized for a batch process, or the reaction can be carried out continuously in a loop reactor or in a continuous stirred reactor. Typically, the polymerizations disclosed herein are carried out using a slurry polymerization process in a loop reaction zone. Suitable diluents used in slurry polymerization are well known in the art and include hydrocarbons which are liquid under reaction conditions. The term "diluent" as used in this disclosure does not necessarily mean an inert material, as this term is meant to include compounds and compositions that may contribute to polymerization process. Examples of hydrocarbons that can be used as diluents include, but are not limited to, cyclohexane, isobutane, n-butane, propane, n-pentane, isopentane, neopentane, and n-hexane. Typically, isobutane is used as the diluent in a slurry polymerization. Examples of this technology are found in U.S. Pat. Nos. 4,424,341; 4,501,885; 4,613,484; 4,737,280; and 5,597,892; each of which is incorporated by reference herein, in its entirety.

For purposes of the invention, the term polymerization reactor includes any polymerization reactor or polymerization reactor system known in the art that is capable of polymerizing olefin monomers to produce homopolymers or copolymers of the present invention. Such reactors can comprise slurry reactors, gas-phase reactors, solution reactors, or any combination thereof. Gas phase reactors can comprise fluidized bed reactors or tubular reactors. Slurry reactors can comprise vertical loops or horizontal loops. Solution reactors can comprise stirred tank or autoclave reactors.

Polymerization reactors suitable for the present invention can comprise at least one raw material feed system, at least one feed system for catalyst or catalyst components, at least one reactor system, at least one polymer recovery system or any suitable combination thereof. Suitable reactors for the present invention can further comprise any one, or combination of, a catalyst storage system, an extrusion system, a cooling system, a diluent recycling system, or a control system. Such reactors can comprise continuous take-off and direct recycling of catalyst, diluent, and polymer. Generally, continuous processes can comprise the continuous introduction of a monomer, a catalyst, and a diluent into a polymerization reactor and the continuous removal from this reactor of a suspension comprising polymer particles and the diluent.

Polymerization reactor systems of the present invention can comprise one type of reactor per system or multiple reactor systems comprising two or more types of reactors operated in parallel or in series. Multiple reactor systems can comprise reactors connected together to perform polymerization, or reactors that are not connected. The polymer can be polymerized in one reactor under one set of conditions, and then the polymer can be transferred to a second reactor for polymerization under a different set of conditions.

In one aspect of the invention, the polymerization reactor system can comprise at least one loop slurry reactor. Such reactors are known in the art and can comprise vertical or horizontal loops. Such loops can comprise a single loop or a series of loops. Multiple loop reactors can comprise both vertical and horizontal loops. The slurry polymerization can be performed in an organic solvent that can disperse the catalyst and polymer. Examples of suitable solvents include butane, hexane, cyclohexane, octane, and isobutane. Monomer, solvent, catalyst and any comonomer are continuously fed to a loop reactor where polymerization occurs. Polymerization can occur at low temperatures and pressures. Reactor effluent can be flashed to remove the solid resin.

In yet another aspect of this invention, the polymerization reactor can comprise at least one gas phase reactor. Such systems can employ a continuous recycle stream containing one or more monomers continuously cycled through the fluidized bed in the presence of the catalyst under polymerization conditions. The recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone.

In still another aspect of the invention, the polymerization reactor can comprise a tubular reactor. Tubular reactors can make polymers by free radical initiation, or by employing the catalysts typically used for coordination polymerization. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams are intermixed for polymerization. Heat and pressure can be employed appropriately to obtain optimal polymerization reaction conditions.

In another aspect of the invention, the polymerization reactor can comprise a solution polymerization reactor. During solution polymerization, the monomer is contacted with the catalyst composition by suitable stirring or other means. A carrier comprising an inert organic diluent or excess monomer can be employed. If desired, the monomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed during polymerization to obtain better temperature control and to maintain uniform polymerization mixtures throughout the polymerization zone. Adequate means are utilized for dissipating the exothermic heat of polymerization. The polymerization can be effected in a batch manner, or in a continuous manner. The reactor can comprise a series of at least one separator that employs high pressure and low pressure to separate the desired polymer.

In a further aspect of the invention, the polymerization reactor system can comprise the combination of two or more reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactors. Alternatively, polymerization in multiple reactors can include the manual transfer of polymer from one reactor to subsequent reactors for continued polymerization. Such reactors can include any combination including, but not limited to, multiple loop reactors, multiple gas reactors, a combination of loop and gas reactors, a combination of autoclave reactors or solution reactors with gas or loop reactors, multiple solution reactors, or multiple autoclave reactors.

After the polymers are produced, they can be formed into various articles, including but not limited to, household containers, utensils, film products, drums, fuel tanks, pipes, geomembranes, and liners. Various processes can form these articles. Usually, additives and modifiers are added to the polymer in order to provide desired effects. By using the invention described herein, articles can likely be produced at a lower cost, while maintaining most or all of the unique properties of polymers produced with metallocene catalysts.

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims.

Definitions

In order to more clearly define the terms used herein, the following definitions are provided.

The term polymer is used herein to refer to homopolymers of ethylene or copolymers of ethylene and another olefinic comonomer.

The term inert atmosphere is used herein to refer to any type of ambient atmosphere that is substantially unreactive toward the particular reaction, process, or material around which the atmosphere surrounds or blankets. Thus, this term is typically used herein to refer to the use of a substantially oxygen-free and moisture-free blanketing gas, including but not limited to dry argon, dry nitrogen, dry helium, or mixtures thereof, when any precursor, component, intermediate, or product of a reaction or process is sensitive to particular gases or moisture. Additionally, the term inert atmosphere is also used herein to refer to the use of dry air as a blanketing atmosphere when the precursors, components, intermediates, or products of the reaction or process are only moisture-sensitive and not oxygen-sensitive.

The term metallocene is used herein to refer to metallocene and metallocene-like compounds containing one or two $\eta^5$-alkadienyl ligand, one or two $\eta^5$-cycloalkadienyl ligand, and more typically one or two $\eta^5$-cyclopentadienyl ligand, or its analogs or derivatives. Thus, the metallocenes of this invention typically comprise a cyclopentadienyl, indenyl, fluorenyl, or boratabenzene ligand, or substituted derivatives thereof. Possible substituents on these ligands include hydrogen, therefore the description "substituted derivatives thereof" in this invention includes partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like.

The terms catalyst composition, catalyst mixture, and the like are used herein to refer to the mixture of catalyst components disclosed herein, regardless of the actual product of the reaction of the components, the nature of the active catalytic site, or the fate of any one component such as the hydrocarbyl-substituted metallocene or the chemically-treated solid oxide. Therefore, the terms catalyst composition, catalyst mixture, and the like include both heterogeneous compositions and homogenous compositions.

The term hydrocarbyl is used to specify a hydrocarbon radical group that includes, but is not limited to aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, heteroatom substituted derivatives thereof, having from one to about 20 carbon atoms. In one aspect, the term hydrocarbyl refers to a hydrocarbyl group comprising from one to about 20 carbon atoms. In another aspect, the term hydrocarbyl is used to refer to an aliphatic group, an aromatic group, a cyclic group, a combination of aliphatic and cyclic groups, or a substituted derivative thereof, having from 1 to about 20 carbon atoms.

The term precontacted mixture is used herein to describe a first mixture of catalyst components that are contacted for a first period of time prior to the first mixture being used to form a postcontacted or second mixture of catalyst components that are contacted for a second period of time. Typically, the precontacted mixture describes a mixture of hydrocarbyl-substituted metallocene and the chemically-treated solid oxide, before this mixture is introduced into the polymerization reactor. Any optional cocatalyst, for example an organoaluminum compound, may comprise a component of a precontacted mixture, a postcontacted mixture, both, or neither. Thus, "precontacted" describes components that are used to contact each other, but prior to contacting the components in the second, postcontacted mixture. Accordingly, this invention may occasionally distinguish between a component used to prepare the precontacted mixture and that component after the mixture has been prepared. For example, according to this description, it is possible for a precontacted organoaluminum compound, once it is contacted with the hydrocarbyl-substituted metallocene and the chemically-treated solid oxide, to have reacted to form at least one different chemical compound, formulation, or structure from the distinct organoaluminum compound used to prepare the precontacted mixture. In this case, the precontacted organoaluminum compound or component is described as comprising an organoaluminum compound that was used to prepare the precontacted mixture.

Similarly, the term postcontacted mixture is used herein to describe a second mixture of catalyst components that are contacted for a second period of time, and one constituent of which is the precontacted or first mixture of catalyst components that were contacted for a first period of time. For example, the term postcontacted mixture can be used herein to describe the mixture of hydrocarbyl-substituted metallocene, chemically-treated solid oxide, and optional organozinc compound, formed from contacting the precontacted mixture of a portion of these components with any additional components added to make up the postcontacted mixture. Further, some catalyst components may be added in both a first mixture and a second mixture.

The term chemically-treated solid oxide is used interchangeably with terms such as treated solid oxide, acidic activator-support, or simply activator-support, and the like to indicate a chemically-treated, solid oxide of relatively high porosity, which exhibits enhanced Lewis acidic or Brønsted acidic behavior, arising through treatment of the solid oxide with an electron-withdrawing component, typically an electron withdrawing anion or an electron withdrawing anion source compound. In one aspect, the chemically-treated solid oxide of this invention is a chemically-treated inorganic oxide. Any use of the term "support" does not to imply that this component is inert, and it should not be construed as an inert component of the catalyst composition. Rather, the chemically-treated solid oxides is an activating component which, in combination with at least one hydrocarbyl-substituted metallocene, comprises the catalyst composition of this invention to produce polymers.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed above and throughout the text are provided solely for their disclosure prior to the filing date of the present application. Nothing herein is to be construed as an admission that the inventors are not entitled to antedate such disclosure by virtue of prior invention.

For any particular compound disclosed herein, any general structure presented also encompasses all conformational isomers, regioisomers, and stereoisomers that may arise from a particular set of substitutents. The general structure also encompasses all enantiomers, diastereomers, and other optical isomers whether in enantiomeric or racemic forms, as well as mixtures of stereoisomers, as the context requires.

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims.

In the following examples, unless otherwise specified, the syntheses and preparations described therein were carried out under an inert atmosphere such as nitrogen and/or argon. Solvents were purchased from commercial sources and were typically dried prior to use. Unless otherwise specified, reagents were obtained from commercial sources.

EXAMPLE 1

Testing Methods

A "Quantachrome Autosorb-6 Nitrogen Pore Size Distribution Instrument," acquired from the Quantachrome Corporation, Syosset, N.Y., was used to determined surface areas and pore volumes of the chemically-treated solid oxides of this invention. The melt Index (MI) of the polymer product was determined using a 2.16 kg load and High Load Melt Index (HLMI) was determined with a 21.6 kg load at 190° C.

EXAMPLE 2

General Sources and Properties of the Solid Oxide Materials Used to Prepare the Chemically-Treated Solid Oxides Alumina was obtained as Ketjen grade B from Akzo Nobel, having a pore volume of about 1.78 cc/g and a surface area of about 340 $m^2$/g or Ketjen L 95-98% alumina and 2-5% silica having a pore volume of 2.00 cc/g and surface area of 380 $m^2$/g. Silica was obtained as Davison grade 952 from W.R. Grace, having a pore volume of about 1.6 cc/g and a surface area of about 300 $m^2$/g. Silica-alumina was obtained as MS13-110 from W.R. Grace having 13% by weight alumina and 87% by weight silica and having a pore volume of about 1.2 cc/g and a surface area of about 350 $m^2$/g.

EXAMPLE 3

Preparation of Zinc-Impregnated Chlorided Alumina

Ketjen grade B alumina, 544.85 g, was saturated to just past incipient wetness with an aqueous solution of 109 g of zinc chloride in 900 g of water and shaken to ensure uniform wetness. The solid was then dried in a vacuum oven at 120° C. and passed through a 80 mesh screen. A portion of the solid was then calcined in air for three hours at 600° C. using a 10 inch bed in a 45 mm diameter tube and 0.2 to 0.4 SCFH of nitrogen. After calcining, the furnace temperature was maintained at 600° C., and the gas stream was changed from air to dry nitrogen. Then, 15 mL of carbon tetrachloride were injected into the nitrogen stream and evaporated upstream from the alumina bed. The carbon tetrachloride vapor was carried up through the bed and reacted with the alumina in order to chloride the surface to produce a chlorided alumina. The chlorided alumina was white in color.

EXAMPLE 4

Preparation of Fluorided Silica-Alumina

Silica-alumina, MS13-110 from W.R. Grace Company, 700 g, was impregnated to just beyond incipient wetness with a solution containing 70 g of ammonium bifluoride dissolved in 1250 mL of water. This mixture was then placed in a vacuum oven and dried overnight at 120° C. under half an atmosphere of vacuum. The final step in producing activated-support was to calcine the material in dry fluidizing air at 454° C. for 6 hours, after which the chemically-treated solid oxide was stored under nitrogen until used.

EXAMPLE 5

Preparation of Sulfated Alumina

Ketjen L alumina, 652 g, was impregnated to just beyond incipient wetness with a solution containing 137 g of $(NH_4)_2SO_4$ dissolved in 1300 mL of water. This mixture was then placed in a vacuum oven and dried overnight at 110° C. under half an atmosphere of vacuum and then calcined in a muffle furnace at 300° C. for 3 hours, then at 450° C. for 3 hours, after which the activated support was screened through an 80 mesh screen. The support was then activated in air at 550° C. for 6 hours, after which the chemically-treated solid oxide was stored under nitrogen until used.

EXAMPLE 6

General Preparation of the Hydrocarbyl-Substituted Metallocenes

General preparative methods for forming hydrocarbyl-substituted metallocenes by substitution reactions, such as alkylating or arylating a halide-substituted or alkoxide-substituted metallocene, can be found in a various references, including: Wailes, P. C.; Coutts, R. S. P.; Weigold, H. in Organometallic Chemistry of Titanium, Zironium, and Hafnium, Academic; New York, 1974.; Cardin, D. J.; Lappert, M. F.; and Raston, C. L.; Chemistry of Organo-Zirconium and -Hafnium Compounds; Halstead Press; New York, 1986.

EXAMPLE 7

General Description of the Polymerization Runs

The alkyl compounds, including those of FIG. 1 and Table 1, were typically pre-contacted with at least one chemically-treated solid oxide in hydrocarbon solvent prior to injection into the polymerization reactor. All polymerization runs were conducted in a one-gallon (3.785 liter) stainless steel reactor. This reactor employed an air-operated stirrer with a three bladed propeller and was set to operate at 700 rpm for the duration of a polymerization run. The reactor was also encased in a steel jacket with supply lines leading to a heat exchanger unit that was, in turn, connected to cooling water and a steam line, allowing for temperature control.

A typical polymerization procedure is as follows. The initiation of the charging sequence to the reactor was through an opened charge port while venting with isobutane vapor. A poison (moisture, oxygen) scavenger such as diethylzinc, if used, was injected quickly followed by addition of a precontacted slurry of the hydrocarbyl-substituted metallocene and the chemically-treated solid oxide. The charge port was closed and 2 liters of isobutane backed by nitrogen pressure were added. The contents of the reactor were stirred and heated to the desired run temperature, and ethylene was then introduced along with the desired amount of hexene, if used. A mass flow unit allowed the pressure to quickly climb to within 50 psi of the desired run pressure and allowed the smooth transition of ethylene flow until the specified pressure and temperature levels were achieved. These temperature and pressure levels were maintained for the duration of the run. At the completion of the run time the ethylene flow was stopped and the reactor pressure slowly vented off. When the pressure and temperature were safely low, the reactor was opened and the granular polymer powder collected. Activity was specified as either grams of polymer produced per gram of treated solid-oxide or transition metal charged per hour. Representative Experimental data employing the invention to prepare polyethylene and ethylene-1-hexene copolymers are provided in Table 1.

EXAMPLE 8

Sample Polymerization Runs

Table 1 records the results of several polymerization runs and provides data to show that a polymerization catalyst comprising the contact product of the metallocene compounds shown in FIG. 1 in combination with a chemically-treated solid oxide are active even in the absence of cocatalysts such as organoaluminum compounds. In several of these runs, an organozinc cocatalyst was used. While not intending to be bound by theory, it is possible that the organozinc compound functions as a scavenger to remove traces of water and oxygen from the catalyst composition. Comparative Example 20 indicates that diethylzinc is not a good alkylating agent for the dichlorometallocene H shown in FIG. 1.

wherein each substituent on the substituted cyclopentadienyl, substituted indenyl, or substituted fluorenyl ($X^1$) is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, —$SO_2X$, —$OAlX_2$, —$OSiX_3$, —$OPX_2$, —$SX$, —$OSO_2X$, —$AsX_2$, —$As(O)X_2$, or —$PX_2$, wherein X is selected independently from halide, H, $NH_2$, OR, or SR, wherein R is a hydrocarbyl, or a substituted derivative thereof, having from 1 to about 20 carbon atoms; a halide; or hydrogen; and

TABLE 1

Polymerization Data for Forming Ethylene Homopolymers and Ethylene-1-Hexene Copolymers.

| Run No. | $M^a$ | $[M]^b$ | $Sc.^c$ | $C2^d$ | $T^e$ | $Time^f$ | $C_6^g$ | $SO^h$ | $[SO]^i$ | $PE^j$ | $[M]^k$ Act. | $SO^l$ Act. | $MI^m$ | $MI(\times 10)^n$ | $d^o$ |
|---|---|---|---|---|---|---|---|---|---|---|---|---|---|---|---|
| 1 | A | 25 | None | 550 | 80 | 60 | 0 | S | 225 | 44 | 19.4 | 196 | 0 | 0 | 0.9469 |
| 2 | A | 19 | None | 550 | 80 | 60 | 0 | F | 263 | 9 | 5.2 | 34 | 0 | 0 | 0.9371 |
| 3 | B | 3 | DEZ(0.5)$^p$ | 550 | 80 | 60 | 0 | S | 158 | 44 | 225.8 | 278 | 0 | 0 | 0.9489 |
| 4 | B | 5 | None | 550 | 70 | 30 | 0 | S | 240 | 33 | 101.6 | 275 | 0 | 0 | |
| 5 | B | 4 | None | 550 | 70 | 60 | 0 | S | 219 | 18 | 69.3 | 82 | 0 | 0 | |
| 6 | B | 10 | DEZ(0.5) | 550 | 80 | 60 | 30 | S | 180 | 184 | 283.3 | 1022 | 0 | 0.76 | |
| 7 | B | 6 | DEZ(0.5) | 550 | 90 | 30 | 30 | S | 98 | 91 | 233.5 | 1857 | 0.06 | 6.80 | 0.9394 |
| 8 | B | 5 | DEZ(0.5) | 550 | 90 | 30 | 30 | S | 122 | 78 | 240.2 | 1279 | 0.02 | 5.20 | 0.9381 |
| 9 | B | 10 | DEZ(0.5) | 550 | 90 | 15 | 30 | S | 152 | 100 | 154.0 | 2632 | 0.10 | 8.70 | 0.9394 |
| 10 | B | 9.5 | DEZ(0.5) | 550 | 90 | 8 | 30 | S | 150 | 62 | 100.5 | 3100 | 0.20 | 12.20 | 0.9396 |
| 11 | C | 20 | None | 550 | 80 | 60 | 0 | S | 300 | 124 | 58.4 | 413 | 0 | 0 | 0.9314 |
| 12 | C | 30 | None | 550 | 80 | 60 | 0 | Cl | 400 | 56 | 17.6 | 140 | 0 | 0.02 | 0.9476 |
| 13 | D | 20 | None | 550 | 80 | 60 | 0 | Cl | 300 | 81 | 19.2 | 270 | 0 | 0 | |
| 14 | E | 10 | DEZ(0.5) | 550 | 90 | 30 | 30 | S | 200 | 138 | 182.8 | 1380 | 0.05 | 1.30 | |
| 15 | F | 10 | None | 550 | 80 | 60 | 0 | S | 300 | 2 | 1.1 | 7 | 0 | 0 | |
| 16 | G | 10 | DEZ(0.5) | 550 | 90 | 30 | 30 | S | 117 | 98 | 160.8 | 1675 | 0 | 0 | |
| 17 | G | 8 | DEZ(0.5) | 550 | 90 | 30 | 30 | S | 150 | 200 | 276.1 | 2667 | 0 | 0 | |
| Comparative 18 | B | 10 | DEZ(0.5) | 550 | 90 | 30 | 30 | A | 161 | 0 | | | | | |
| Comparative 19 | | | DEZ(0.5) | 550 | 90 | 30 | 30 | S | 123 | 0 | 0.0 | 0 | | | |
| Comparative 20 | H | 5 | DEZ(0.5) | 550 | 90 | 30 | 30 | S | 140 | 4 | | | | | |

$^a$Type of transition metal compound used (see FIG. 1).
$^b$Amount of transition metal compound used in milligrams.
$^c$Scavenger type and amount used (if any) in milliliters.
$^d$ethylene pressure in psi.
$^e$Polymerization reaction temperature in degrees Celsius.
$^f$Length of polyermization reaction in minutes.
$^g$Amount of hexene added to reactor in grams.
$^h$Type of treated solid-oxide used (S = sulfated alumina, F = fluorided silica-alumina, Cl = chlorided zinc-alumina, A = Ketjen L untreated alumina).
$^i$Weight in milligrams of solid oxide used.
$^j$Amount of polymer isolated in grams.
$^k$Metal activity in (gPE/gZr/hr)/1000.
$^l$Solid-oxide Activity in gPE/gSO/hr.
$^m$Melt index (g/10 min.).
$^n$High load melt index (g/10 min.).
$^o$Density of polymer (g/mL).
$^p$DEZ = diethylzinc, 1M heptane solution.
$^q$Hydrogen added to reactor.

We claim:

1. A catalyst composition comprising:
the contact product of a metallocene compound and a chemically-treated solid oxide, wherein:
the metallocene compound has the following formula:

($X^1$)($X^2$)($X^3$)($X^4$)$M^1$;

wherein $M^1$ is selected from titanium, zirconium, hafnium, or vanadium;
($X^1$) is selected from a cyclopentadienyl, an indenyl, a fluorenyl, a substituted cyclopentadienyl, a substituted indenyl, or a substituted fluorenyl;

($X^2$), ($X^3$), and ($X^4$) are independently selected from a hydrocarbyl group or a substituted hydrocarbyl group, having from 1 to about 20 carbon atoms; and
the chemically-treated solid oxide comprises a solid oxide treated with an electron-withdrawing anion;
wherein the solid oxide is selected from silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof;

wherein the catalyst composition is substantially free of an organoaluminum compound having the formula:

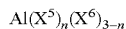

wherein ($X^5$) is a hydrocarbyl having from 1 to about 20 carbon atoms;

wherein ($X^6$) is a halide, hydride, or alkoxide; and wherein n is a number from 1 to 3 inclusive;

wherein the catalyst composition is substantially free of cocatalysts, organoboron compounds, and ionizing ionic compounds; and wherein the a polyolefin is produced upon contacting the catalyst composition with an olefin under polymerization conditions.

2. A catalyst composition comprising:

the contact product of at least one metallocene compound and at least one chemically-treated solid oxide, wherein:

the at least one metallocene compound is selected from a compound of the formula:

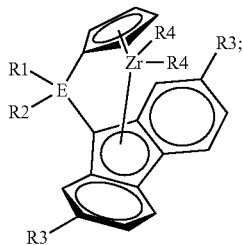

wherein E is selected from C, Si, Ge, or Sn; R1 is selected from H or a hydrocarbyl group having from 1 to about 20 carbon atoms; R2 is selected from an alkenyl group having from about 3 to about 12 carbon atoms; and R3 is selected from H or a hydrocarbyl group having from 1 to about 12 carbon atoms; and R4 is selected from H or a hydrocarbyl group having from 1 to about 20 carbon atoms and the at least one chemically-treated solid oxide comprises a solid oxide treated with an electron-withdrawing anion;

wherein the solid oxide is selected from silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof;

wherein the catalyst composition is substantially free of an organoaluminum compound having the formula:

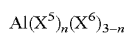

wherein ($X^5$) is a hydrocarbyl having from 1 to about 20 carbon atoms;

wherein ($X^6$) is a halide, hydride, or alkoxide; and wherein n is a number from 1 to 3 inclusive;

wherein the catalyst composition is substantially free of cocatalysts, organoboron compounds, and ionizing ionic compounds; and wherein the a polyolefin is produced upon contacting the catalyst composition with an olefin under polymerization conditions.

3. A catalyst composition comprising:

the contact product of at least one metallocene compound and at least one chemically-treated solid oxide, wherein:

the at least one metallocene compound is selected from:

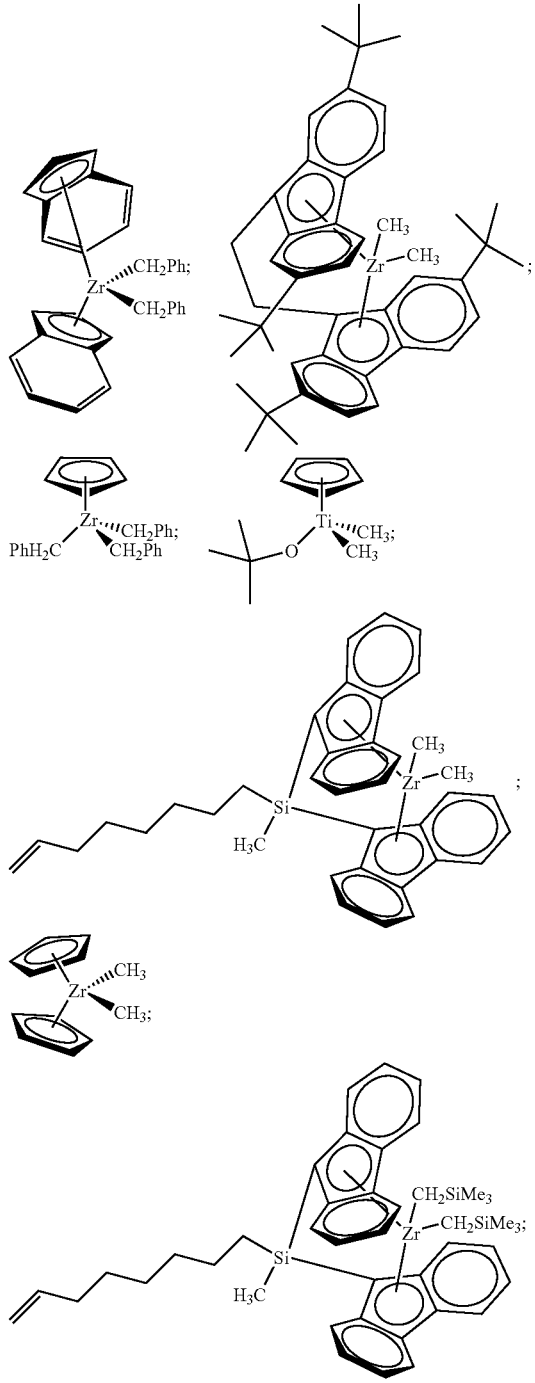

or any combination thereof; and the at least one chemically-treated solid oxide comprises a solid oxide treated with an electron-withdrawing anion;

wherein the solid oxide is selected from silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof;

wherein the catalyst composition is substantially free of an organoaluminum compound having the formula:

$$Al(X^5)_n(X^6)_{3-n}$$

wherein ($X^5$) is a hydrocarbyl having from 1 to about 20 carbon atoms;

wherein ($X^6$) is a halide, hydride, or alkoxide; and wherein n is a number from 1 to 3 inclusive;

wherein the catalyst composition is substantially free of cocatalysts, organoboron compounds, and ionizing ionic compounds; and wherein the a polyolefin is produced upon contacting the catalyst composition with an olefin under polymerization conditions.

4. A catalyst composition comprising:

the contact product of at least one metallocene compound and at least one chemically-treated solid oxide, wherein:

the at least one metallocene compound is selected from:

bis(cyclopentadienyl)hafnium dimethyl;
bis(cyclopentadienyl)zirconium dibenzyl;
1,2-ethanediylbis($\eta^5$-1-indenyl) dimethylhafnium;
1,2-ethanediylbis($\eta^5$-1-indenyl)dimethylzirconium;
3,3-pentanediylbis($\eta^5$-4,5,6,7-tetrahydro-1-indenyl) hafnium dimethyl;
methylphenylsilylbis($\eta^5$-4,5,6,7-tetrahydro-1-indenyl) zirconium dimethyl;
bis(1-n-butyl-3-methyl-cyclopentadienyl)zirconium dimethyl;
bis(n-butylcyclopentadienyl)zirconium dimethyl;
dimethylsilylbis(1-indenyl)zirconium bis(trimethylsilylmethyl);
octyl(phenyl)silylbis(1-indenyl)hafnium dimethyl;
dimethylsilylbis($\eta^5$-4,5,6,7-tetrahydro-1-indenyl)zirconium dimethyl;
dimethylsilylbis(2-methyl-1-indenyl)zirconium dibenzyl;
1,2-ethanediylbis(9-fluorenyl)zirconium dimethyl;
(indenyl)trisbenzyl titanium(IV);
(isopropylamidodimethylsilyl)cyclopentadienyltitanium dibenzyl;
bis(pentamethylcyclopentadienyl)zirconium dimethyl;
bis(indenyl)zirconium dimethyl;
methyl(octyl)silylbis(9-fluorenyl)zirconium dimethyl;
bis(2,7-di-tert-butylfluorenyl)-ethan-1,2-diyl)zirconium (IV) dimethyl;
or any combination thereof; and the at least one chemically-treated solid oxide comprises a solid oxide treated with an electron-withdrawing anion;

wherein the solid oxide is selected from silica, alumina, silica-alumina, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof;

wherein the catalyst composition is substantially free of an organoaluminum compound having the formula:

$$Al(X^5)_n(X^6)_{3-n}$$

wherein ($X^5$) is a hydrocarbyl having from 1 to about 20 carbon atoms;

wherein ($X^6$) is a halide, hydride, or alkoxide; and wherein n is a number from 1 to 3 inclusive;

wherein the catalyst composition is substantially free of cocatalysts, organoboron compounds, and ionizing ionic compounds; and wherein the a polyolefin is produced upon contacting the catalyst composition with an olefin under polymerization conditions.

5. A catalyst composition comprising:

the contact product of a metallocene compound and a chemically-treated solid oxide, wherein:

the metallocene compound has the following formula:

$$(\eta^5\text{-cycloalkadienyl})M^2R^2{}_nX_{3-n};$$

wherein cycloalkadienyl is selected from cyclopentadienyl, indenyl, fluorenyl, or substituted analogs thereof;

$M^2$ is selected from Ti, Zr, or Hf;

$R^2$ is independently selected from substituted or non-substituted alkyl, cycloalkyl, aryl, aralkyl, having from 1 to about 20 carbon atoms;

X is independently selected from F; Cl; Br; I; or substituted or non-substituted alkyl, cycloalkyl, aryl, aralkyl, alkoxide, or aryloxide having from 1 to about 20 carbon atoms; and n is an integer from 1 to 3 inclusive; and the chemically-treated solid oxide comprises a solid oxide treated with an electron-withdrawing anion;

wherein the solid oxide is selected from silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof; and wherein the catalyst composition is substantially free of an organoaluminum compound having the formula:

$$Al(X^5)_n(X^6)_{3-n}$$

wherein ($X^5$) is a hydrocarbyl having from 1 to about 20 carbon atoms;

wherein ($X^6$) is a halide, hydride, or alkoxide; and wherein n is a number from 1 to 3 inclusive;

wherein the catalyst composition is substantially free of cocatalysts, organoboron compounds, and ionizing ionic compounds; and wherein the a polyolefin is produced upon contacting the catalyst composition with an olefin under polymerization conditions.

6. A process to produce a catalyst composition comprising:

contacting a metallocene compound and a chemically-treated solid oxide, wherein:

the metallocene compound has the following formula:

$$(X^1)(X^2)(X^3)(X^4)M^1;$$

wherein $M^1$ is selected from titanium, zirconium, hafnium, vanadium, niobium, tantalum, chromium, molybdenum, or tungsten;

($X^1$) is selected from a Group-I ligand, wherein the Group-I ligand is selected from a cyclopentadienyl, an indenyl, a fluorenyl, a substituted cyclopentadienyl, a substituted indenyl, or a substituted fluorenyl;

wherein each substituent on the substituted cyclopentadienyl, substituted indenyl, or substituted fluorenyl ($X^1$) is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, —SO$_2$X, —OAlX$_2$, —OSiX$_3$, —OPX$_2$, —SX, —OSO$_2$X, —AsX$_2$, —As(O)X$_2$, or —PX$_2$, wherein X is selected independently from halide, H, NH$_2$, OR, or SR, wherein R is a hydrocarbyl, or a substituted derivative thereof, having from 1 to about 20 carbon atoms; a halide; or hydrogen;

(X$^3$) is selected from an aliphatic group, an aromatic group, a cyclic group, a combination of aliphatic and cyclic groups, or a substituted derivative thereof, having from 1 to about 20 carbon atoms;

(X$^4$) is independently selected from a Group-II ligand, wherein the Group-II ligand is selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, —SO$_2$X, —OAlX$_2$, —OSiX$_3$, —OPX$_2$, —SX, —OSO$_2$X, —AsX$_2$, —As(O)X$_2$, or —PX$_2$, wherein X is selected independently from halide, H, NH$_2$, OR, or SR, wherein R is a hydrocarbyl, or a substituted derivative thereof, having from 1 to about 20 carbon atoms; a halide;

(X$^2$) is independently selected from a Group-I or a Group-II ligand;

wherein (X$^1$) and (X$^2$) are optionally connected by a bridging group, wherein the length of the bridging group between (X$^1$) and (X$^2$) is one, two, or three atoms; the one, two, or one, two, or three atoms of the bridging group are independently selected from C, Si, Ge, or Sn; the bridging group is saturated or unsaturated; and the bridging group is substituted or unsubstituted; and wherein any substituent on the bridging group is independently selected from an alkenyl group, an alkynyl group, an alkadienyl group, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, —SO$_2$X, —OAlX$_2$, —OSiX$_3$, —OPX$_2$, —SX, —OSO$_2$X, —AsX$_2$, —As(O)X$_2$, or —PX$_2$, wherein X is selected independently from halide, H, NH$_2$, OR, or SR, wherein R is a hydrocarbyl, or a substituted derivative thereof, having from 1 to about 20 carbon atoms; a halide; or hydrogen; and the chemically-treated solid oxide comprises a solid oxide treated with an electron-withdrawing anion;

wherein the solid oxide is selected from silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof;

wherein the catalyst composition is substantially free of an organoaluminum compound having the formula:

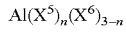

wherein (X$^5$) is a hydrocarbyl having from 1 to about 20 carbon atoms;

wherein (X$^6$) is a halide, hydride, or alkoxide; and wherein n is a number from 1 to 3 inclusive;

wherein the catalyst composition is substantially free of cocatalysts, organoboron compounds, and ionizing ionic compounds; and wherein the a polyolefin is produced upon contacting the catalyst composition with an olefin under polymerization conditions.

* * * * *